(12) United States Patent
Kishimoto et al.

(10) Patent No.: US 7,408,504 B2
(45) Date of Patent: Aug. 5, 2008

(54) GPS POSITION MEASURING METHOD AND GPS POSITION MEASURING SYSTEM

(75) Inventors: Nobuhiro Kishimoto, Osaka (JP); Seiichiro Hirata, Nagaokakyo (JP)

(73) Assignee: Magellan Systems Japan Inc., Osaka (JP)

( * ) Notice: Subject to any disclaimer, the term of this patent is extended or adjusted under 35 U.S.C. 154(b) by 331 days.

(21) Appl. No.: 10/933,398

(22) Filed: Sep. 3, 2004

(65) Prior Publication Data

US 2005/0116860 A1 Jun. 2, 2005

(30) Foreign Application Priority Data

Dec. 1, 2003 (JP) .............................. 2003-402075

(51) Int. Cl.
*G01S 1/00* (2006.01)
(52) U.S. Cl. .............................. 342/357.12; 342/357.02
(58) Field of Classification Search ............ 342/357.12, 342/357.02
See application file for complete search history.

(56) References Cited

U.S. PATENT DOCUMENTS

| | | | | |
|---|---|---|---|---|
| 4,894,655 | A * | 1/1990 | Joguet et al. ................. | 340/988 |
| 5,134,407 | A * | 7/1992 | Lorenz et al. ................ | 342/352 |
| 5,148,452 | A * | 9/1992 | Kennedy et al. ............. | 375/343 |
| 5,192,957 | A * | 3/1993 | Kennedy ................ | 342/357.12 |
| 5,271,034 | A * | 12/1993 | Abaunza ..................... | 375/150 |
| 5,293,170 | A * | 3/1994 | Lorenz et al. ................ | 342/352 |
| 5,420,592 | A * | 5/1995 | Johnson .................. | 342/357.12 |
| 5,459,473 | A * | 10/1995 | Dempster et al. ...... | 342/357.12 |
| 5,576,715 | A * | 11/1996 | Litton et al. ............ | 342/357.12 |
| 5,663,734 | A | 9/1997 | Krasner ....................... | 342/357 |
| 5,781,156 | A * | 7/1998 | Krasner .................. | 342/357.12 |
| 5,874,914 | A * | 2/1999 | Krasner .................. | 342/357.12 |
| 6,236,355 | B1 * | 5/2001 | Farmer ................... | 342/357.06 |
| 6,297,770 | B1 * | 10/2001 | Ueda et al. ............. | 342/357.12 |
| 6,329,946 | B1 | 12/2001 | Hirata et al. ........... | 342/357.12 |
| 6,429,811 | B1 * | 8/2002 | Zhao et al. ............. | 342/357.09 |
| 6,437,736 | B2 * | 8/2002 | Ueda et al. ............. | 342/357.12 |
| 6,483,457 | B2 * | 11/2002 | Hirata et al. ........... | 342/357.12 |
| 6,498,584 | B2 * | 12/2002 | Naruse ................... | 342/357.12 |
| 6,661,371 | B2 * | 12/2003 | King et al. ............. | 342/357.02 |
| 6,674,402 | B2 * | 1/2004 | Hirata et al. ........... | 342/357.12 |
| 7,057,553 | B2 * | 6/2006 | Jandrell ................. | 342/357.12 |

(Continued)

*Primary Examiner*—Thomas H. Tarcza
*Assistant Examiner*—Harry Liu
(74) *Attorney, Agent, or Firm*—Kratz, Quintos & Hanson, LLP.

(57) ABSTRACT

A GPS positioning method to obtain pseudorange between a receiver terminal and a satellite by capturing a portion of received satellite signals of a predetermined time duration. A predetermined number of first input signals, equivalent to 1-bit of navigation data, are obtained with various delays in the starting point of processing. The first input signals are synchronously summed up to obtain second input signals. A PN code replica (pseudopattern) prepared by the receiver terminal operates on the second input signals to detect the polarity of the navigation bits and correct the polarity of the bits so that the bit polarity of the second input signals are always positive. Synchronous summation is conducted on the resulting signals, which have been derived from the complete captured signal, and a correlation calculation is conducted on the obtained synchronously summed signal using a replica PN code prepared by the receiver terminal, the signal delay value is detected and pseudorange is obtained using the result of the correlation calculation.

6 Claims, 15 Drawing Sheets

U.S. PATENT DOCUMENTS

| | | | |
|---|---|---|---|
| 7,254,402 B2* | 8/2007 | Vayanos et al. | 455/456.1 |
| 2002/0077751 A1* | 6/2002 | Mieno et al. | 701/213 |
| 2002/0123352 A1* | 9/2002 | Vayanos et al. | 455/456 |
| 2003/0030584 A1* | 2/2003 | Hirata et al. | 342/357.12 |
| 2003/0216864 A1* | 11/2003 | Fukuda et al. | 701/216 |
| 2006/0033657 A1* | 2/2006 | Lawrence et al. | 342/357.11 |
| 2007/0085738 A1* | 4/2007 | Whitehead et al. | 342/357.04 |
| 2007/0126629 A1* | 6/2007 | Krikorian et al. | 342/359 |

\* cited by examiner

GPS POSITION MEASURING METHOD AND GPS POSITION MEASURING SYSTEM

BACKGROUND OF THE INVENTION

1. Field of the Invention

This invention relates to a GPS position measuring method and a GPS position measuring system to obtain pseudoranges between a number of satellites and a roving receiver terminal by processing signals from the satellites, and then computing the position of the terminal. The receiver terminal achieves higher sensitivity than a conventional stand-alone GPS receiver by also receiving and utilizing aiding information transmitted from a base station, or server. Such a system is often called an assisted GPS system to distinguish it from a conventional stand-alone receiver.

2. Description of the Related Art

Many GPS satellites are orbiting around the earth, and continuously transmitting signals at the same carrier frequency. A periodic pseudorandom noise (PN) code (called C/A code for GPS), which is different for each of the satellites, is transmitted by the satellite as biphase PSK modulation of the carrier. In GPS signals one frame (or period) of the C/A PN code is 1 msec (1 millisecond) long, as shown in FIG. 1, and the frame is repeated continuously. Navigation data, including information such as orbital parameters of the satellite, is also transmitted from the satellite as 50 bit/sec biphase PSK modulation. Each bit of this data is 20 msec long and contains 20 successive periods of the C/A code modulation, which are inverted for a data bit value of −1 and not inverted for a data bit value of 1.

An example of a conventional assisted GPS position measuring system which enhances sensitivity can be found in U.S. Pat. No. 5,663,734. In this system, as shown in FIG. 14, a receiving unit 104 has an RF to IF converter 106 provided with a GPS receiving antenna 105, an A/D converter 107 to convert analog signals from the RF to IF converter 106 into digital signals, a memory (digital snapshot memory) 108 to record output of the A/D converter 107, and a general-purpose programmable digital signal processing circuit 109 (referred to as a DSP circuit) to process the signals from the memory 108.

The receiving unit 104 also has a program EPROM memory 110 connected to the DSP circuit 109, a frequency synthesizer 111, a power regulator 112, a write address circuit 113, a microprocessor 114, a RAM memory 115, an EEPROM memory 116, and a modem 118 having a transmitting-receiving antenna 117 and connected to the microprocessor 114.

The operation of this conventional assisted GPS system is as follows: The base station 101 commands the receiving unit 104 to conduct measurement through a message transmitted by a data-communication link 119. The message transmitted by base station 101 contains a list of visible satellites identified by satellite ID number and the Doppler frequency shift for each satellite as received at the base station 101. The message is received by the modem 118 within the receiving unit 104, and stored in the RAM memory 115 connected to the microprocessor 114. The microprocessor 114 controls data information transfer between the write address circuit 113 and the modem 118, and controls power-management function in the receiving unit 104.

When the receiving unit 104 receives a command (from the base station 101, for example) to initiate processing of the GPS signal, the Doppler shift information for the visible satellites is also received. This Doppler information is stored in RAM memory 115 and the microprocessor 114 then activates the power regulator circuit 112 according to the command. The power regulator circuit 112 in turn activates the RF to IF converter 106, the A/D converter 107, the memory 108, the DSP circuit 109, and the frequency synthesizer 111 via power lines 120a through 120e. The signal from the GPS satellites received through the GPS receiving antenna 105 is digitized by the A/D converter 107 after being down-converted from RF to the IF frequency, and the digitized signal is stored in the memory 108.

The stored signal generally has a duration of 100 msec to 1 sec (or longer).

The DSP circuit 109 processes the signal stored in memory 108 to obtain the pseudorange for each of the satellites being considered. The DSP circuit 109 can use the fast Fourier transform (FFT) algorithm to greatly accelerate the speed of the pseudorange calculations, which requires many cross-correlation operations between locally-made PN code references and the PN codes of the received GPS signals. As is well known in the art, the FFT can compute these cross-correlations much faster than direct time-domain correlation methods.

When the DSP circuit 109 completes the calculations of pseudorange for each of the satellites, this information is transmitted to the microprocessor 114 through an interconnect bus 122. The microprocessor 114 then utilizes the modem 118 to transmit the pseudorange data to the base station 101 through the data-communication link 119 for final position calculation.

In addition to the pseudorange data, a time lag can also be simultaneously transmitted to the base station 101. This lag is the time delay from the start of the data collection in the memory 108 to the transmission of the pseudorange data through the data communication link 119. Knowledge of this time lag enables the base station 101 to determine when data collection actually started, which is necessary in order to compute the positions of the rapidly moving satellites at that moment. These positions are used in the calculations of the pseudoranges, which in turn are used by the positioning algorithm to obtain an accurate position of the roving receiver.

The modem 118 utilizes the separate transmitting-receiving antenna 117 to transmit and receive the message through the data-communication link 119. The modem 118 includes a communications receiver and a communications transmitter, both of which are connected to the transmitting-receiving antenna 117. Similarly, the base station 101 uses a separate transmitting-receiving antenna 103 to transmit and receive data link messages. The base station 101 can continuously receive the GPS signals through a separate GPS receiving antenna 102.

It is expected that the necessary time for pseudorange calculation by the DSP circuit 109 is less than a few seconds according to the amount of data stored in the memory 108 and the speed of the DSP circuit 109 (or several DSP circuits, if required).

As previously described, the memory 108 captures a signal record corresponding to a relatively long period of time (perhaps 100 msec to 1 second or more). All pseudoranges to the visible GPS satellites can be calculated using this same large stored block of data, which permits enough processing gain to achieve higher sensitivity than a GPS receiver using standard continuous tracking techniques. Thus, superior performance is obtained at a low signal reception levels (caused by buildings, trees, etc. blocking the signals). However, more processing is required as compared to a standard receiver. Such processing can be achieved by using efficient techniques such as the FFT or other fast convolution methods.

The object of the signal processing conducted by the DSP circuit 109 is to determine the delay of received PN code waveforms relative to similar locally-generated PN code wave forms. The received GPS signal (C/A code) is composed of repeating pseudorandom PN frames, each frame consisting of 1023 chips at a nominal chipping rate of $1.023 \times 10^6$ chips/sec. Thus the duration of each frame is 1 msec.

The signal processing steps performed by the DSP circuit 109 are shown in FIGS. 15A through 15E. FIG. 15A shows the repeating frames of the received PN code and their relationship to the data bits of the navigation message. Although there are actually 20 PN frames within each navigation data bit. FIG. 15A shows 4 frames per bit for the sake of simplicity. The polarity of the 4 PN frames within a bit is reversed if the bit is 0 (it is convenient to think of the bit value as −1 in this case) and is not reversed if the bit is 1. The first step in processing is to coherently add the 4 (actually 20) PN frames within each data bit, producing the result shown in FIG. 15B. This process (also called coherent synchronous addition) adds corresponding chips in each of the 4 (actually 20) PN frames to produce a result that looks like a single PN frame per navigation data bit, with its polarity inverted if the data bit is 0 (−1) and not inverted of the data bit is 1.

For simplicity of explanation, in FIG. 15 it is assumed that the locations of the navigation data bit boundaries are known, resulting in the proper grouping of the 4 PN frames to be synchronously added. In reality the locations of the bit boundaries are not known. This could cause a problem. For example, if the first of the 4 frames to be synchronously averaged were frame 2 in FIG. 15A, then the change in navigation data bit from 0 to 1 (occurring at the beginning of frame 4) would cause frames 4 and 5 to cancel out frames 2 and 3. In U.S. Pat. No. 5,663,734, which exemplifies the system being described here, no provision is made for determining the locations of the navigation data bit boundaries. This is a disadvantage, since the processing gain can be significantly reduced due to the aforementioned cancellation when the grouping of the frames is such that navigation data bit for some frames in the group is 0 (−1) and for other frames is 1. Thus, a solution to this problem is needed.

After each group of 4 PN frames are synchronously added, each of the resulting 1 msec waveforms of FIG. 15B is correlated with a replica of the PN code to produce the correlation functions shown in FIG. 15C. Note that the polarity of the peak value of a correlation function is positive when the polarity of the result of the synchronous summation is the same as the polarity of the replica PN code in the receiver, and negative when the polarities are opposite.

FIG. 15D shows the magnitudes of the correlation results of FIG. 15C, which are always positive and do not reflect the polarity changes caused by the navigation data bits. The results of the correlation calculations obtained as magnitudes are then synchronously added to produce the result shown in FIG. 15E (this process is often called noncoherent synchronous addition).

At this point the sensitivity (S/N ratio) has been greatly enhanced by the coherent synchronous coherent addition of many groups of PN frames (for example, 1000 frames occur in 1 second of signal data), followed by cross-correlation and noncoherent synchronous summation of the magnitudes of the correlation functions.

Another conventional GPS position measuring system, appearing in U.S. Pat. No. 6,329,946, will now be described. This system is similar to the previously described system in that the roving terminal captures a portion the GPS signals (perhaps 100 msec to 1 sec or more) as it emerges from the A/D converter. The stored data contains repeating frames of the C/A code of each visible satellite, and, as described earlier, some of the frames have inverted polarities according to the sign of the GPS navigation data bits. However, this system differs from the previous one in that the base station (server) detects the same navigation data bit sequence that is being received by the roving terminal and transmits it to the roving terminal, thus permitting the terminal to remove the data modulation from its stored signal. This process, referred to as homogenization, makes the polarities of all PN code frames to be the same, and permits synchronous summation of all received frames. As constrasted to coherent synchronous summation of only 20 frames per data bit, the processing gain thereby obtained is much greater than would otherwise be possible, and results in a very high sensitivity of the roving receiver terminal.

However, the sequence of the navigation data bits as received by the server and that received by the terminal are not necessarily in time alignment, because of unknown and variable delays in the server-to-terminal communication link. One method of solving this problem would be for the receiver terminal of the GPS position measuring system to send a timing signal to the server, which in turn could send a timing signal back to the terminal, permitting the terminal to determine the communication delay. Knowledge of the communication time delay would permit determination of the phase difference of the navigation data from the base station and the corresponding data collected at the terminal. The former bit sequence could thereby time-aligned with the latter, permitting homogenization of the PN frames at the terminal. Ideal noise reduction would then be obtained by synchronous summation after the homogenization.

However, in many communication links, such as Internet or packet communication, the communication delay is highly variable and unknown, which prevents the above solution from being effective. In this case the data bit sequence sent by the server to the receiver terminal must be repeatedly scanned with shifts to many different positions in time in order to find the proper time alignment. For each value of shift, all coherent summations must be repeated in order to detect the signal. This can greatly increase the response time required to obtain the position of the receiver terminal. It is therefore a great disadvantage that receiver signal processing can not be conducted within a practical response time for high-sensitivity position determination without the strict requirement of knowing the communication time delay in the communication circuit.

It is therefore an object of the present invention to provide a GPS position determination method and a GPS position measuring system in which the position of the receiver terminal is measured with super-high sensitivity and a short response time, even if the server-terminal communication link has greatly variable communication delay and the satellite signal is received inside a building, etc., namely, the satellite signal is attenuated.

BRIEF DESCRIPTION OF THE DRAWINGS

The present invention will be described with reference to the accompanying drawings in which.

DESCRIPTION OF THE PREFERRED EMBODIMENTS

Preferred embodiments of the present invention will now be described with reference to the accompanying drawings.

Figure 1:
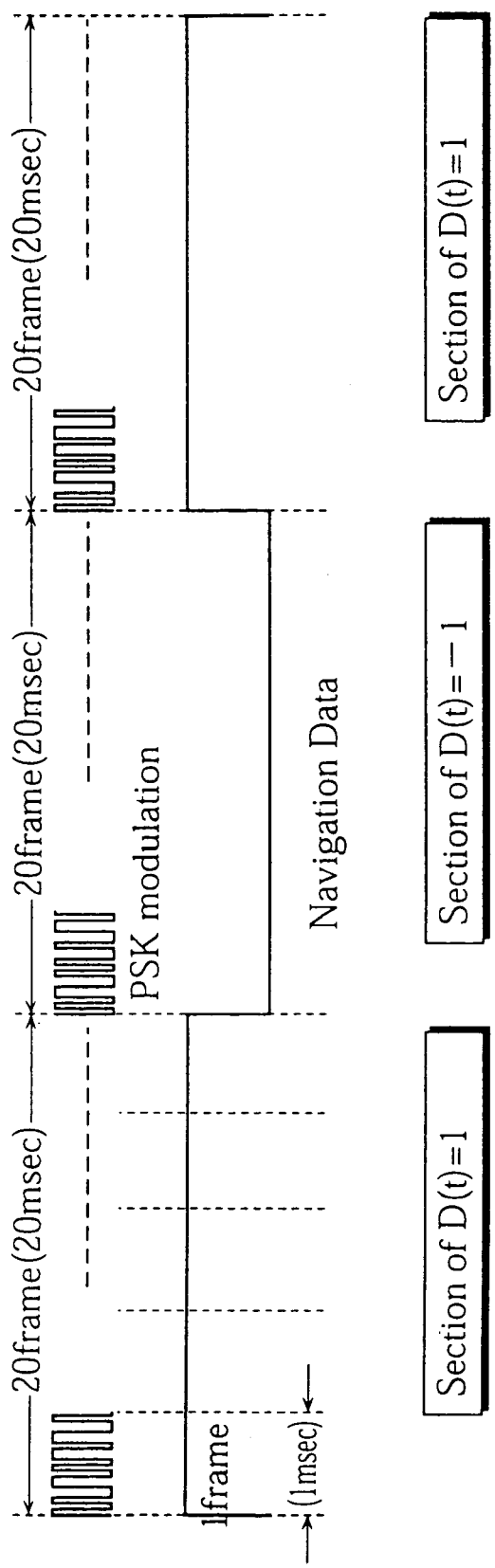
FIG. 1 is an explanatory diagram of the PN code structure in the GPS received signals.
Figure 2:
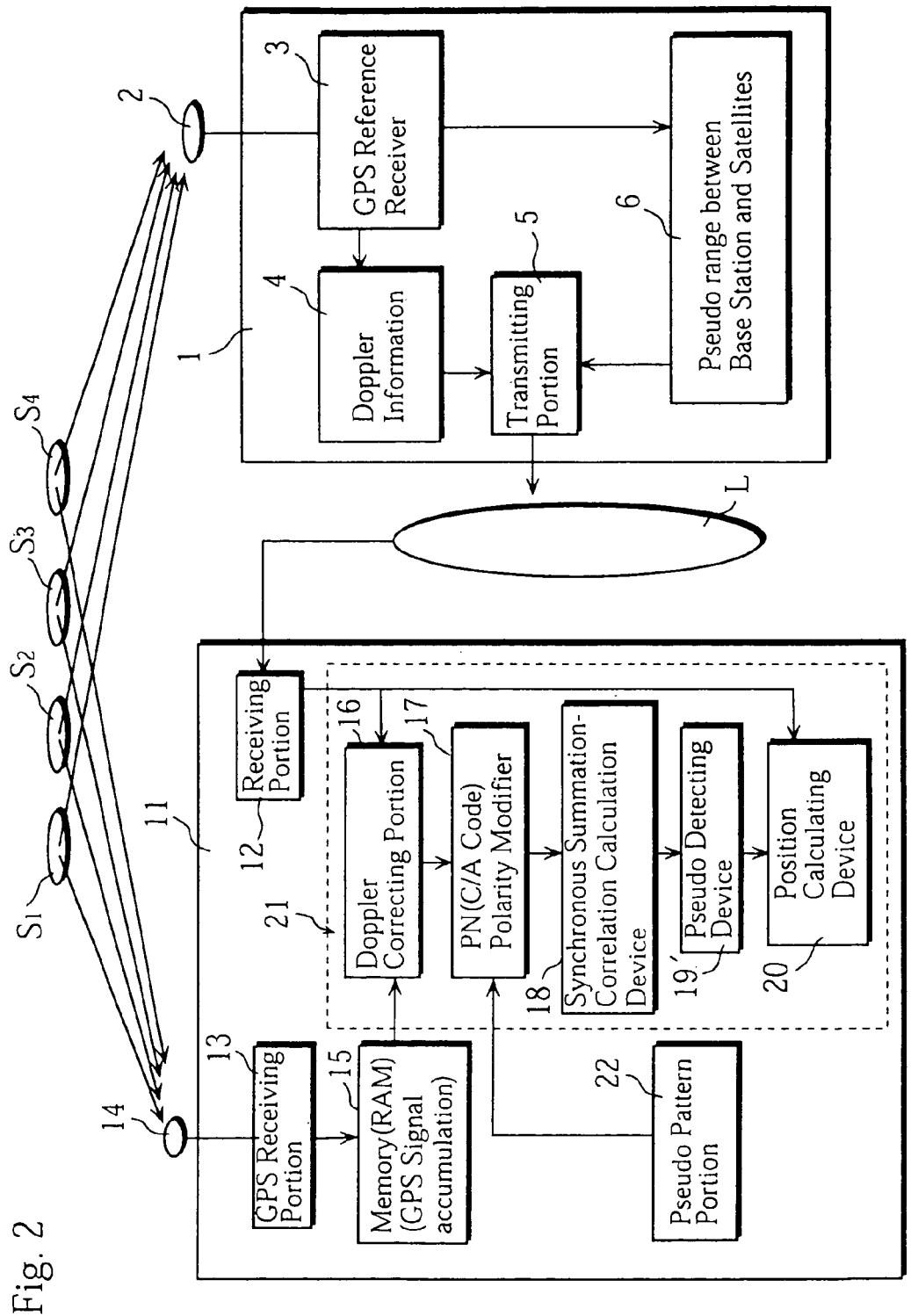
FIG. 2 is a block diagram showing an outline of an embodiment of the present invention.

FIG. 1 is an explanatory diagram of a PN signal structure (also called a C/A code when the signal is a GPS signal), and FIG. 2 is an explanatory block diagram of the GPS position measuring system of the present invention.

In the present invention, carrier may be layered or not in receiving the PN signal.

Referring to FIG. 2, the present invention is a GPS position measuring system and method in which a receiver terminal 11 receives signals from a plurality of satellites, and calculates the pseudorange to each of the satellites, using received satellite signals which have been captured during a predetermined time interval T (perhaps 0.5 sec to 1 sec or more).

In FIG. 2, $S_1$, $S_2$, $S_3$, and $S_4$ represent the satellites used for positioning and 1 represents a base station. The base station 1 is provided with a GPS reference receiver 3 connected to a receiving antenna 2 having a clear view of the satellites.

The GPS reference receiver 3 extracts Doppler information 4 from the received satellite GPS signals, and also determines positions of the satellites and the pseudoranges between the satellites and the receiving antenna 2. These pieces of information, together with the known position of the base station, are transmitted by a transmitting portion 5 to the receiver terminal 11 through a communication means L. This transmission is generally conducted by broadcast, in which the transmission is one-way from the base station to the receiver terminal. The communication means L may be any of available electromagnetic means including, but not limited to, a cellular phone circuit, ground broadcast, satellite broadcast, or Internet circuit.

The Doppler information 4, the position 6 of the base station, the positions of the satellites, and the pseudoranges between the satellites and the base station are received by a receiving portion 12 of the GPS receiver terminal 11.

The receiving portion 12 may also serve as the GPS receiving portion 13 when the frequency of the broadcast signal from the base station is near the frequency of the GPS signal. The present invention is intended to have many terminals 11 simultaneously receive the signal through the communication means L.

The GPS receiver terminal 11 contains a GPS receiving portion 13 connected to a GPS receiving antenna 14. Although the GPS antenna 14 might be located where the satellite S is directly visible, it also might be located where the GPS signal is much weaker, such as under the trees or inside a building.

The receiving portion 13 of terminal 11 amplifies and transforms the received analog GPS signals into digital baseband form by means of an A/D converter. The baseband data, which contains the PN codes of the satellites, is stored in a RAM memory 15.

The structures described above are widely used in conventional GPS technology, so a detailed explanation of the structures is omitted.

The receiver terminal 11 is provided further with a signal processing portion 21 and a pseudopattern portion 22 which contains a replica (pseudopattern) of the PN code for each satellite used for positioning. Pseudopattern A (described later) is preliminarily stored and a signal processing portion 21. The signal processing portion 21 has a Doppler correcting portion 16, a PN polarity modifying device 17, a synchronous summation-correlation calculation device 18, a pseudorange detecting device 19, and a position calculating device 20.

Figure 3:
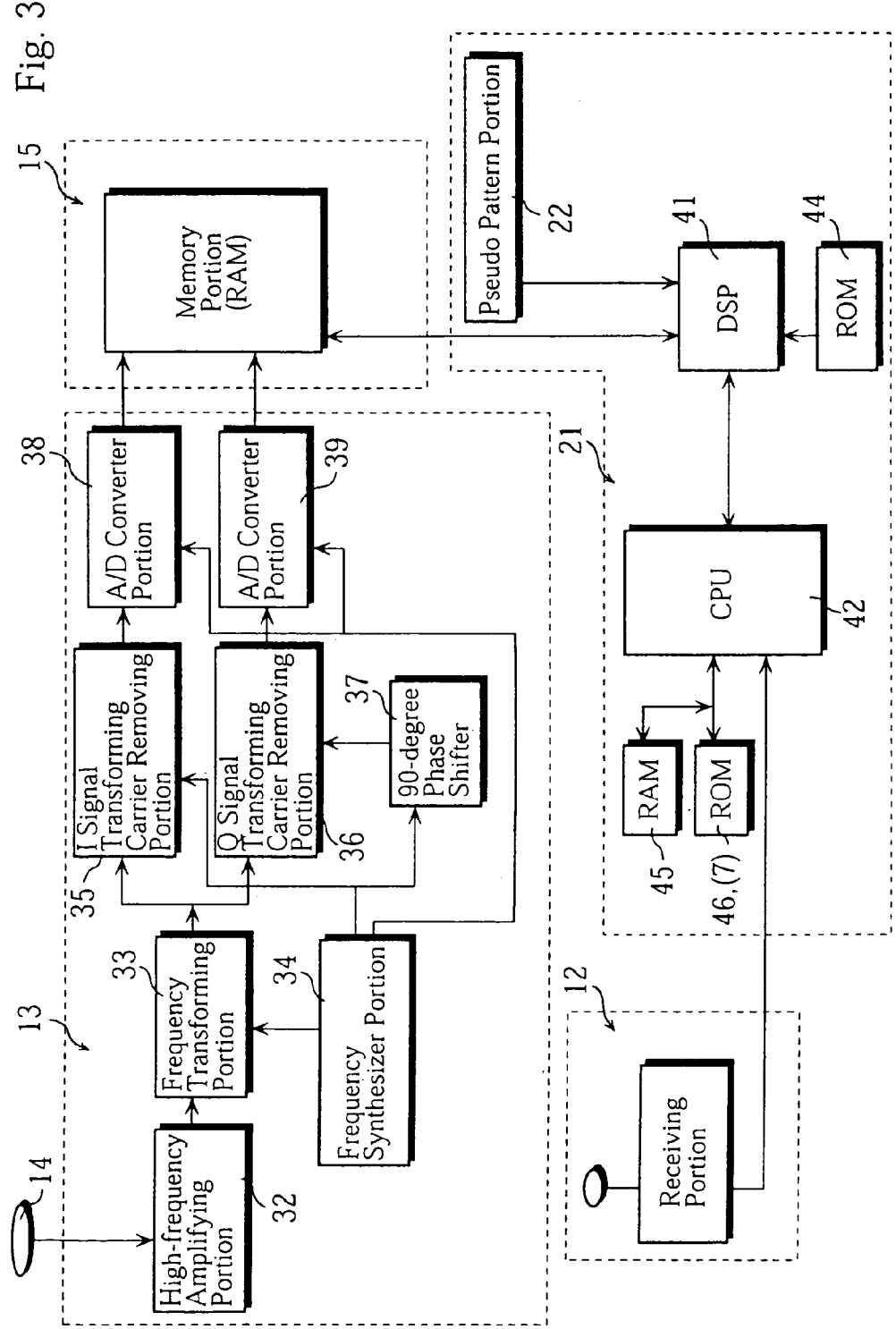
FIG. 3 is a block diagram showing the components of a GPS receiver terminal.

FIG. 3 is a hardware block diagram of the GPS receiver terminal 11 which shows the hardware used in carrying out the functions shown in FIG. 2. The GPS antenna 14 and the blocks 12, 13, 15, 21, and 22 correspond with items in FIG. 2 having the same labels.

In FIG. 3 signals from the GPS satellites are received at the GPS antenna 14 and enter the GPS receiver portion 13, where they are amplified in a high-frequency RF amplifier 32, transformed to a lower intermediate-frequency (IF) in mixer 33, and then are converted into I and Q baseband signals by the I signal converter 35 and the Q signal converter 36. Local oscillator sinusoids of fixed frequency, required by the mixer and the I and Q signal converters, are provided by frequency synthesizer 34. As is standard practice for generation of I and Q baseband signals, the local oscillator frequency for the I and Q signal converters is the same, but the waveform for the Q signal converter is shifted by 90 degrees by phase shifter 37. The output signals from the I and Q signal converters are respectively digitized by A/D converters 38 and 39.

The digitized I and Q signals from A/D converters 38 and 39, which together form a sequence of complex signal samples, are stored in RAM memory 15 for further processing by signal processing portion 21. The duration of the stored complex signal is predetermined, with typical values from 0.5 sec to 1 sec or longer.

Signal processing portion 21 consists of a digital signal processor (DSP) portion 41, a central processing unit (CPU) 42, a pseudopattern portion 22 which is a read-only memory (ROM) in which the C/A code PN sequences for the satellites are stored, a ROM 44 for the DSP portion 41, and a RAM 45 and ROM 46 for the CPU 42.

The communication receiver portion 12 receives information from the base station 1 which aids the receiver terminal 11 in obtaining high sensitivity and rapid response time. The information received by the communication receiver portion 12 is stored in RAM 45 under control of CPU 42.

The functions of the various blocks in FIG. 3 will now be described in more detail. The antenna portion 14 receives GPS signals which have been transmitted with a 1575.42 MHz carrier frequency and modulated with C/A codes unique to each satellite. The signals from antenna portion 14 are amplified and filtered by the high-frequency RF amplifier 32, and then are down-converted to an IF frequency by mixer 33. Frequency synthesizer 34 provides a local oscillator frequency to mixer 33 which yields an IF signal output frequency which is much lower than 1575.42 MHz. For concreteness in what follows, an IF frequency of 70 MHz is assumed, although other IF frequencies could be used as well. The 70 MHz IF signal is then converted to a complex baseband signal consisting of I (real part) and Q (imaginary part) components which are respectively produced by I signal converter 35 and Q signal converter 36. Except for signal Doppler, the baseband signal is at zero frequency, so the conversion to baseband removes the carrier component of the signal and leaves only the PN code sequence, modulated by the 50 bps navigation data.

Figure 5:
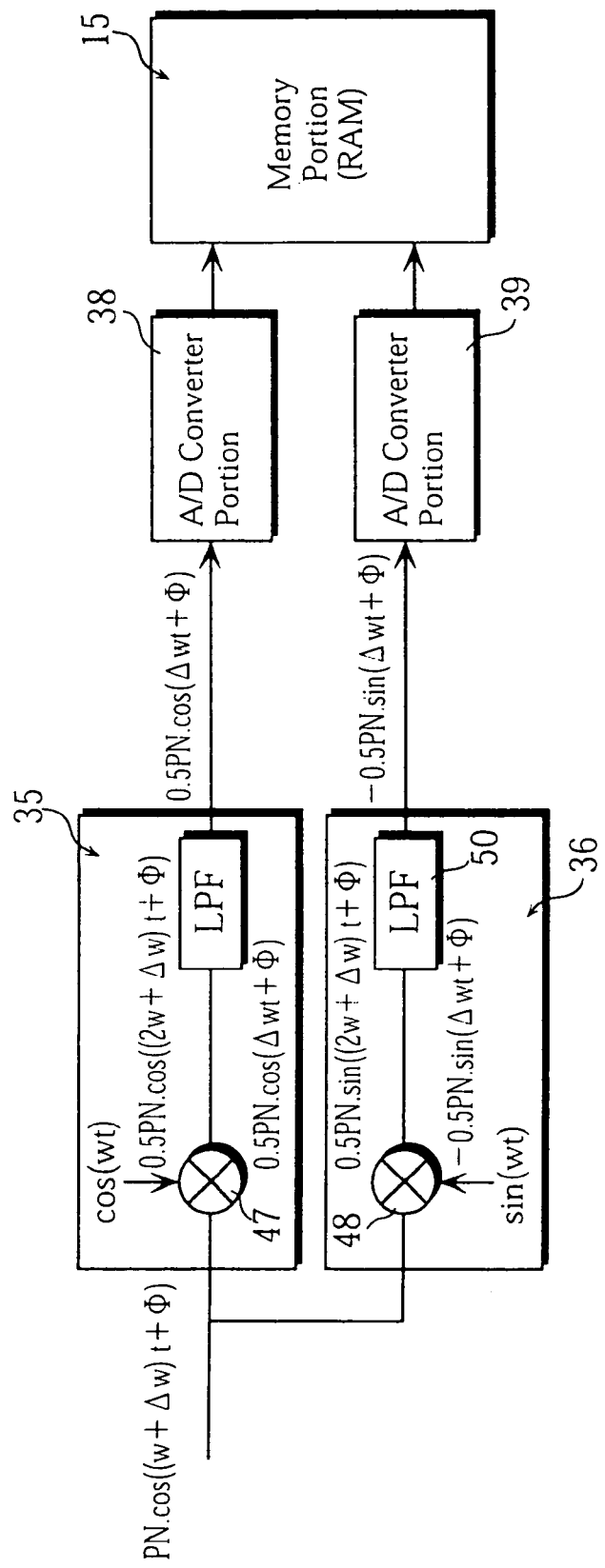
FIG. 5 is an explanatory diagram of the transformation of the IF signal into I and Q baseband signals (thus removing the carrier), the A/D converters, and a RAM memory section (snapshot memory) which captures the digitized baseband signal.

The conversion to baseband is shown in more detail in FIG. 5. The I signal converter 35 consists of a multiplier 47 and a low-pass filter (LPF) 49. Similarly, Q signal converter 36 also contains a multiplier 48 and a LPF 50. The inputs to multiplier 47 in I signal converter 35 are the 70 MHz IF signal and a 70 MHz local oscillator signal from frequency synthesizer 34 (FIG. 3). The 70 MHz local oscillator signal has the mathematical representation cos ωt, where $\omega=2\pi(70\times10^6)$ rad/sec. The IF signal has the mathematical representation PN·cos $[(\omega+\Delta\omega)t+\Phi]$, where PN represents the PN code modulation, $\Delta\omega$ represents the Doppler shift of the signal, and $\Phi$ represents signal phase. For simplicity, the navigation data modulation has been omitted, and it is assumed that the 70 MHz local oscillator signal has no frequency error (if there were such an error, it would simply appear as additional Doppler shift on the signal). The inputs to multiplier 48 in the Q signal converter are the 70 MHz IF signal and the 70 MHz local oscillator signal with a 90 degree phase shift provided by phase shifter 37 (FIG. 3). In this case the local oscillator signal is represented by sin ωt. Using well-known trigonometric identities, it can be shown that the outputs of the multipliers 47 each contain a baseband component centered near zero frequency and a frequency component near twice the IF frequency (i.e., near 140 MHz). Low-pass filters 38 and 39 are designed to pass only the baseband signal components, which are $$\frac{1}{2} \cdot PN \cdot \cos(\Delta\omega t + \Phi)$$

at the output of LPF 49 of the I signal converter, and $$-\frac{1}{2} \cdot PN \cdot \sin(\Delta\omega t + \Phi)$$

at the output of LPF 50 of the Q signal converter. These two signals are the mutually orthogonal real and imaginary parts of a complex analytic signal from which the carrier frequency has been removed, but which retains the Doppler shift frequency $\Delta\omega$.

The I and Q signals at the outputs of the low-pass filters are separately converted into digital samples by A/D converters 38 and 39 shown in FIG. 5, and the digital samples are stored in RAM memory 15. It is common practice to use 1-bit A/D converters in order to conserve memory, at a cost of about 2 dB of SNR loss. The time span of the stored samples is nominally 1 second, but could be more or less than this value. For concreteness, a time span of 1 second will be assumed (equivalent to a 50-bit section of the 50 bps navigation data).

The previously mentioned high-frequency RF amplifier 32, the mixer 33, the frequency synthesizer 34, the I signal converter (carrier removing) 35, the Q signal converter (carrier removing) 36, the phase shifter 37, and the A/D converters 38 and 39 are general purpose components and are widely used.

Again referring to FIG. 3, the digital signal processing portion 21 processes the signal data stored in RAM memory 15 and in performing this processing, uses the data received from the base station (server). This data is available from the communication receiver 12, connected to the CPU 42, which passes the data to RAM memory 45.

Processing of the data in RAM memory 15 is performed by DSP 41 connected to ROM 44 and the pseudopattern portion 22, which is ROM memory containing replica PN codes for each satellite. As each satellite signal is processed, the PN code replica for that satellite is made available to DSP 41.

The CPU 42, the RAM 45, and the ROM 46 work together as a microprocessor, which controls the signal processing performed by DSP 41, ROM 44, and pseudopattern portion 22, and also performs the position calculation and other general functions.

The digital signal processing portion 21 executes the functional blocks within the receiver terminal 11 shown in FIG. 2, namely, the Doppler correcting portion 16, the polarity modifying device 17, the synchronous summation-correlation device 18, the pseudorange detecting device 19, and the position calculating device 19.

Figure 7:
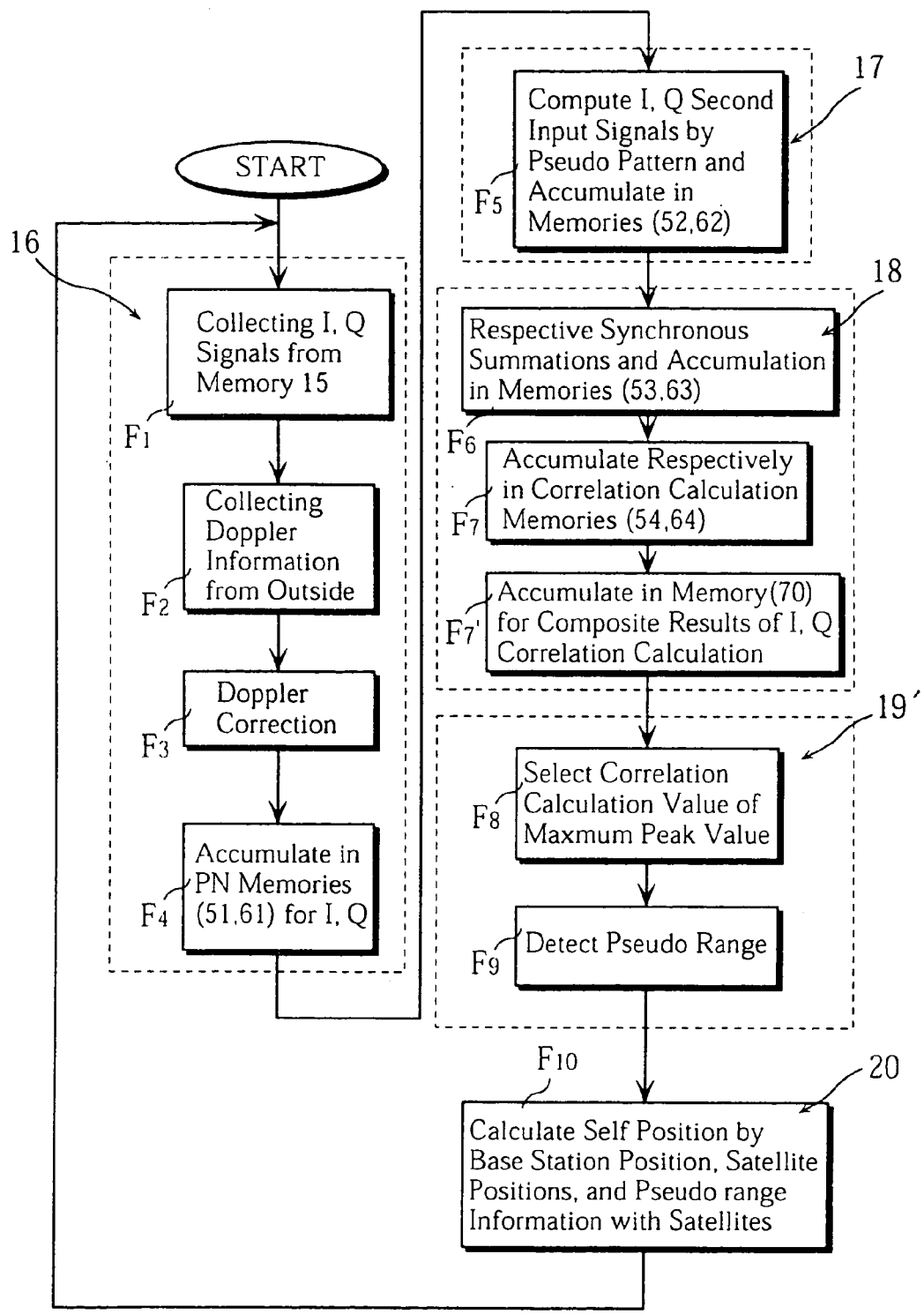
FIG. 7 is a flow chart showing the steps from the reception of GPS signals to obtaining pseudorange.

A flow chart of execution of the functional blocks of the digital signal processing portion 21 in FIG. 2 by software is shown in FIG. 7. We now describe these functions in more detail. The large functional blocks in FIG. 7, namely, the Doppler correcting portion 16, the polarity modifying device 17, the synchronous summation-correlation calculation device 18, the pseudorange detecting device 19, and the position calculating device 20 correspond to those of the digital signal processing portion 21 in FIG. 2. $F_1$ through $F_{10}$ are software processes within the larger functional blocks.

First, the 1-second segment of the received GPS signal is retrieved from memory 15. This data has I and Q components of the form $$\frac{1}{2} \cdot PN \cdot \cos(\Delta\omega t + \Phi) \text{ and } -\frac{1}{2} \cdot PN \cdot \sin(\Delta\omega t + \Phi),$$

and was previously digitized by the A/D converters 38 and 39 of FIG. 3. The data includes Doppler frequency shift $\Delta\omega$.

t=0:Δw:W×T in discrete value. This means that t is a discrete value by sample interval Δt from 0 to W×T. Sampling frequency is fKHz. f=N in the present case. T=1 msec and W=1023. The sampling interval Δt is equal to 1/f.

Next, the Doppler frequency Δω is collected from the base station 1 (process $F_2$). The Doppler frequency Δω is available through the receiving portion 12 of the GPS receiver terminal 11 from the base station 1 (server) in FIG. 2. Δω is received by the CPU portion 42 and stored in the RAM 45.

Figure 6:
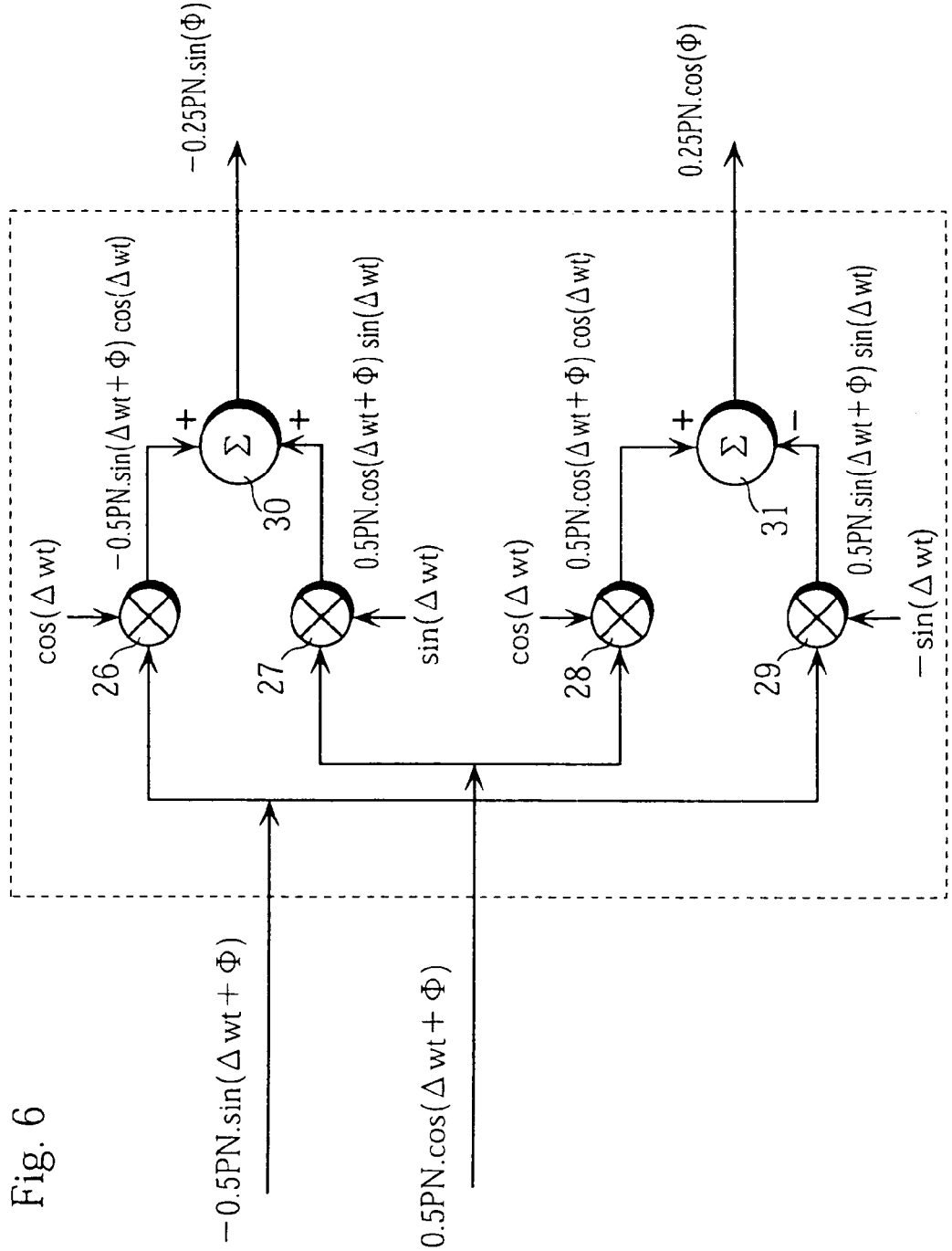
FIG. 6 is an explanatory diagram of the process which obtains PN signals by Doppler correction of the I and Q baseband signals after the the carrier is removed.

Then, Doppler correction is conducted by software (process $F_3$), as shown in FIG. 6. The mathematical operations are performed by multipliers 26 through 29 and adders 30 and 31. The multipliers and the adders are easily implemented in software. The I component $$\frac{1}{2} \cdot PN \cdot \cos(\Delta \omega t + \Phi)$$

from memory 15 is the signal input to multipliers 27 and 28, and and the Q component $$-\frac{1}{2} \cdot PN \cdot \sin(\Delta \omega t + \Phi)$$

is the signal input to multipliers 26 and 29. The remaining inputs for multipliers 26 through 29 are respectively cos Δωt, sin Δωt, cos Δωt, and −sin Δωt, where the value of Δω has been obtained from the server. The outputs of multipliers 26 and 27 are respectively $$-\frac{1}{2} \cdot PN \cdot \sin(\Delta \omega t + \Phi)\cos \Delta \omega t \text{ and } \frac{1}{2} \cdot PN \cdot \cos(\Delta \omega t + \Phi)\sin \Delta \omega t,$$

which are summed in adder 30 to produce the Q output $$-\frac{1}{4} \cdot PN \cdot \sin \Phi.$$

The outputs of multipliers 28 and 29 are respectively $$\frac{1}{2} \cdot PN \cdot \cos(\Delta \omega t + \Phi)\cos \Delta \omega t \text{ and } \frac{1}{2} \cdot PN \cdot \sin(\Delta \omega t + \Phi)\sin \Delta \omega t,$$

which are summed in adder 31 to produce the I output $$\frac{1}{4} \cdot PN \cdot \cos \Phi.$$

The Q output signal $$-\frac{1}{4} \cdot PN \cdot \sin \Phi$$

and the I output signal $$\frac{1}{4} \cdot PN \cdot \cos \Phi$$

now have been compensated for Doppler and have stationary phase Φ. These signals are stored in the memory portions 51 and 61 in FIG. 4 (process $F_4$).

Figure 8:
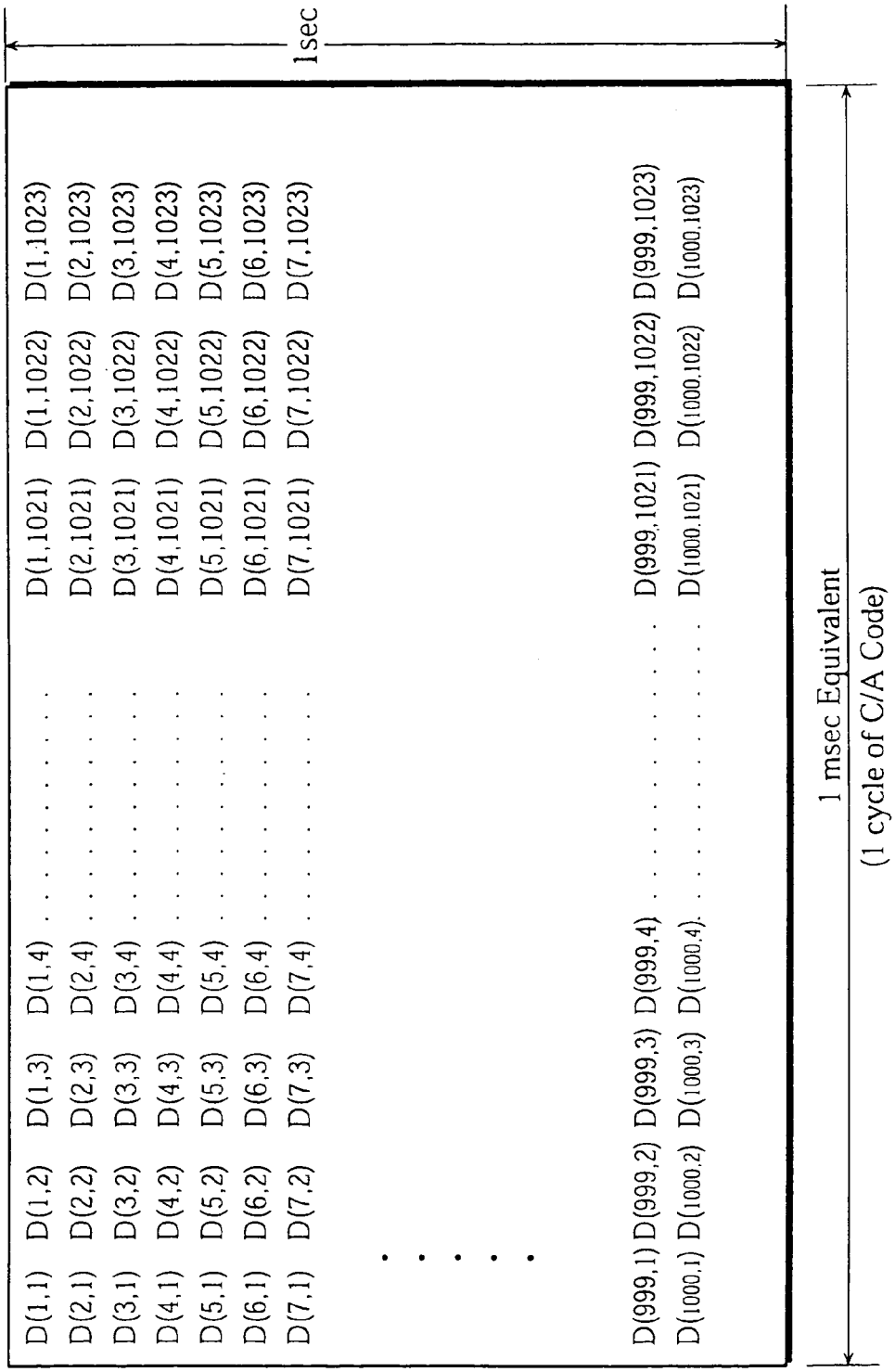
FIG. 8 is a diagram of the contents of the RAM snapshot memory, which shows the organization of the signal structure stored as samples within the memory.

FIG. 8 shows an example of how the Doppler compensated I signal data is arranged in memory by process $F_4$ (the arrangement is identical for the Q signal data). The arrangement consists of 1000 rows and N columns of signal samples, where N is the number of samples spanning one period of the GPS C/A code. N is preferably 1023 to 2046, and is 1023 in FIG. 8 for illustrative purposes. Assuming a 1023 kHz sampling rate, each row of 1023 samples is equivalent to 1 frame of the C/A code which is 1 msec long. There is a total of 1000 rows, because the collected data is assumed to span a time interval of 1 sec.

It is convenient to use the following notation for identifying various portions of the I (or Q) memory shown in FIG. 8. D(M1:M2, N1:N2) will denote the set of samples located in row M1 to row M2 and column N1 to column N2. D(M, N1:N2) denotes the samples in row M which are in columns N1 to N2, and D(M1:M2, N) denotes the samples in column N which are in rows M1 to M2. Therefore, the complete sequence of samples in FIG. 8 is expressed by D(1:1000, 1:N) (N=1023 in FIG. 8).

The next step consists of coherent synchronous summation of the 20 PN code frames within each navigation data bit, called first input signals, over the full 1 second of captured data (50 bits). The result of summing the 20 frames within each data bit is a single "compressed" PN code frame of duration 1 msec. Thus, there will be 50 such compressed frames, called second input signals, that are produced from 1 second of captured data. The coherent synchronous summing process provides approximately 13 dB of processing gain.

Figure 9:
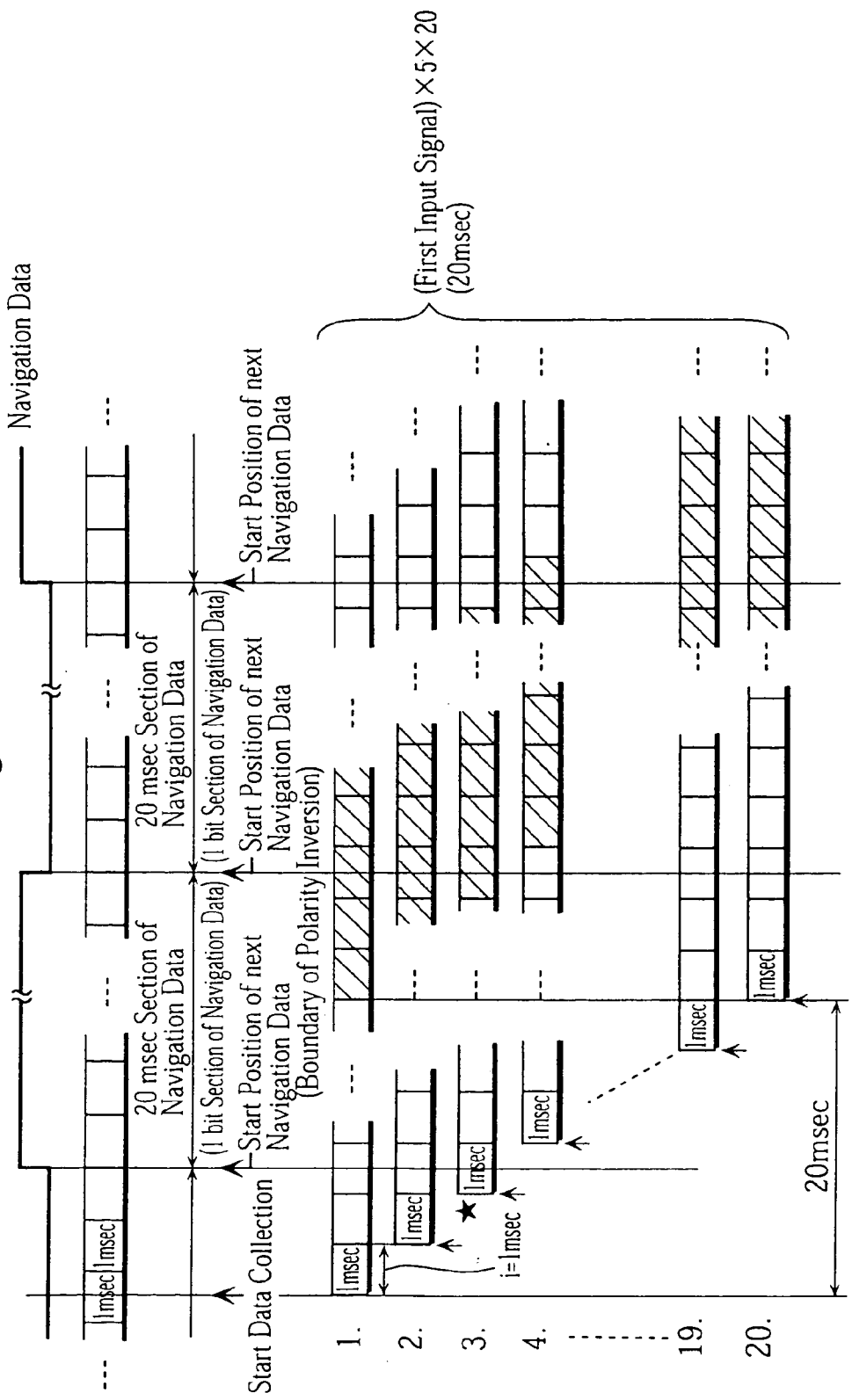
FIG. 9 is an explanatory diagram showing the 1 msec shifts of the beginning point of processing of the captured GPS signal (the optimum point being closest to a boundary of the navigation data bits)

Since the locations of the navigation data bit boundaries are not known, there is uncertainty as to the proper starting point in summing each group of 20 PN frames (first input signals). Severe degradation of the processing gain would occur if the navigation data bits changed polarity near the middle of each group. For this reason, the coherent synchronous summation process described above is actually performed 20 times using different starting points in the Doppler compensated data residing in I memory 51 and Q memory 61 of FIG. 4. FIG. 9 shows the relative starting points of the processing. The 20 starting points are spaced 1 msec apart so that one of the starting points will be within 0.5 msec of a data bit boundary and hence be nearly optimal (as an example, the third starting point of FIG. 9 is closest to a data bit boundary, and is identified by an asterisk). This optimal starting point assures that any changes in the polarity of the data bits can occur only within the first or last of the 20 PN periods that are synchronously summed in each group. Since the entire coherent synchronous summation process is performed 20 times (once for each starting point), it is desirable that such processing be performed in parallel in order to reduce the total time required for computation.

Figure 4:
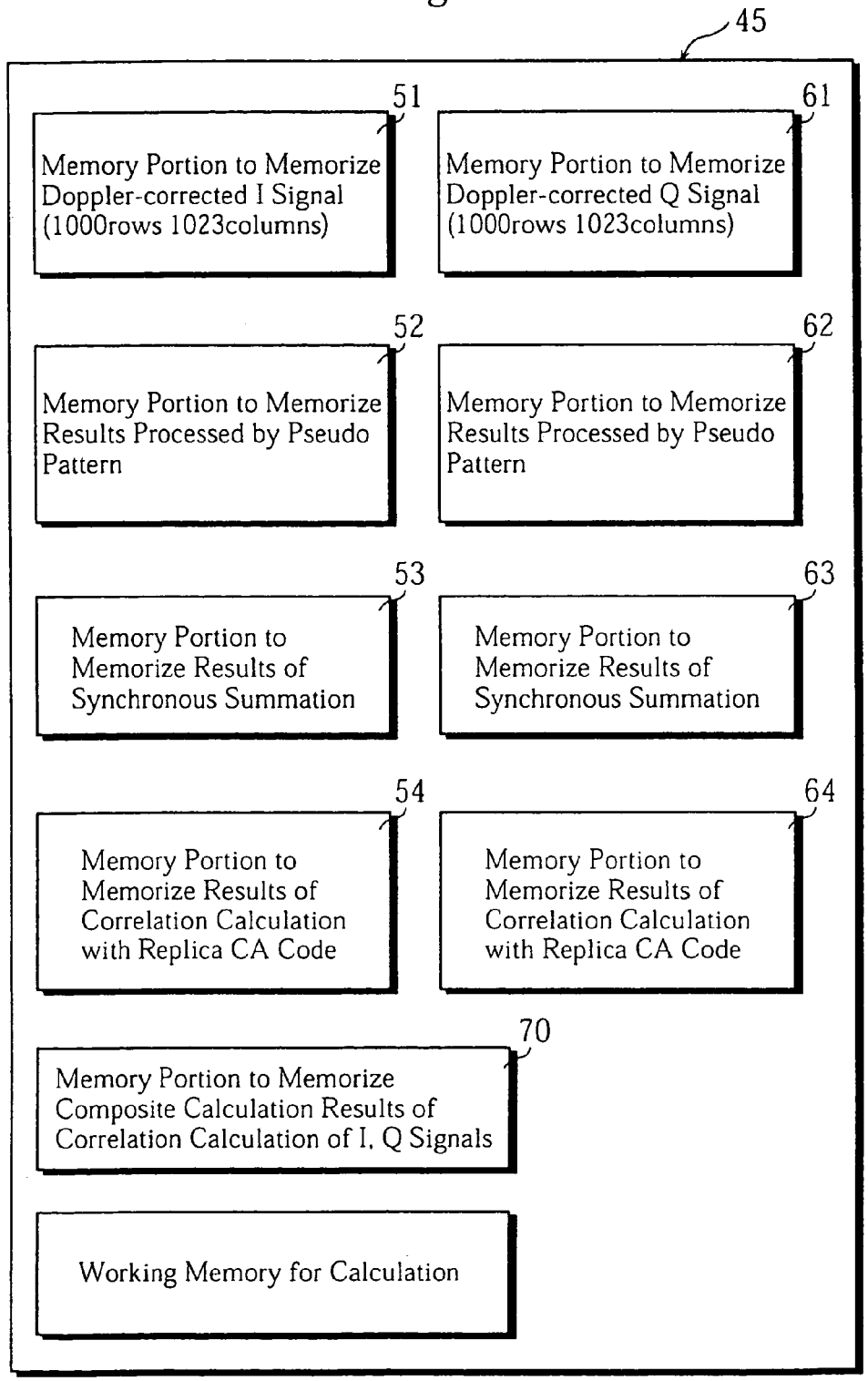
FIG. 4 is an explanatory diagram showing the different sections of memory and their functions.

The process of coherent synchronous summation can be illustrated by again referring to FIG. 8, showing the contents of the I memory 51 of FIG. 4 containing the digitized I Doppler compensated signal (identical processing is performed on the contents of the Q memory 61). For simplicity of explanation, it is assumed that the sample D(1, 1) in the upper left of the memory is the first sample occurring after a data bit boundary. Since each row of the memory contains one frame of PN code, the first 20 rows represent the 20 frames within one bit of navigation data. The data in these rows, i.e., D(1:20, 1:1023), is synchronously summed along columns as follows: The first sum is D(1, 1)+D(2, 1)+ . . . +D(20, 1), the second sum is D(1, 2)+D(2, 2)+ . . . +D(20, 2), and so on. The last sum is D(1, 1023)+D(2, 1023)+ . . . +D(20, 1023). Each of the 1023 numbers thus obtained is the sum of corresponding chips in 20 PN frames, and forms a single 1 msec compressed frame containing 1023 samples.

The next 20 rows, which are the 20 PN frames within the next data bit, are then synchronously summed in a similar fashion, followed by synchronous summation of the next 20 rows, etc. When all summing is complete, there will be 50 compressed frames. The polarity of some compressed frames will be reversed by the data bit modulation, but there will be no loss of processing gain.

In the previous description it has been assumed that a navigation data bit boundary occurs just prior to the sample D(1, 1) in the I signal memory 51 (or Q memory 61) of FIG. 4, shown in detail in FIG. 8. Since the location of the data bit boundaries is not actually known, the entire synchronous summation process is performed 20 times, the first time starting with sample D(1, 1) as described above, the second time starting with sample D(2, 1) which occurs 1 msec later, the third time starting with sample D(3, 1) which occurs 2 msec later, . . . , and finally the $20^{th}$ time starting with sample D(20, 1) which occurs 19 msec later. This process is shown diagrammatically in FIG. 11, and is the process conducted within Block A of FIG. 10. As the 20 repetitions of the synchronous summing proceed, with increasing delays of the starting point in increments of 1 msec. the summation of the frames in the last data bit would require 20 msec of additional data beyond the 1-sec contents of the memory in FIG. 8. One solution is to extend the length of data capture from 1 sec to 1.02 sec. Alternately, the summation of the frames in the last data bit can be omitted with negligible loss in processing gain.

In order to more fully understand the coherent synchronous summation process, as well as subsequent processing, a simplified mathematical description is needed. For simplicity, we consider only the first of the 20 starting times. Although there are 50 coherent synchronous summations for each starting time (each summation involving 20 PN frames), these 50 summation processes are identical, so we only consider the summation of the first 20 frames of data arranged in memory as shown in FIG. 8, and assume that sample D(1, 1) is the first sample following a data bit boundary. We also assume one sample per C/A code chip. The first row of memory contains the signal $$DATA \times CA + NOISE \quad (1)$$

Where DATA has the constant value +1 or −1 for all 1023 samples in the row (in fact, DATA has this constant value for the first 20 rows of memory, a fact which we will use later). CA represents one frame of the C/A PN code, which consists of 1023 values, each value being +1 or −1. NOISE also consists of 1023 independent random values from a zero-mean Gaussian distribution with variance $\sigma^2$. Although the samples in memory are 1-bit samples, it is convenient to think of them as unquantized. Each of rows 2 through 20 also contain a signal of the form given by (1), where DATA×CA is identical to DATA×CA in the first row. However, the samples of NOISE in the 20 rows are all random, but with the same statistics. When the first 20 rows are synchronously summed, the result is the 1023-sample compressed frame $$SIG2 = 20 \times DATA \times CA + NOISE' \quad (2)$$

where the samples of NOISE' are independent, each having variance $20\sigma^2$. The notation SIG2 has been used to identify the compressed frame as a second input signal.

Figure 10:
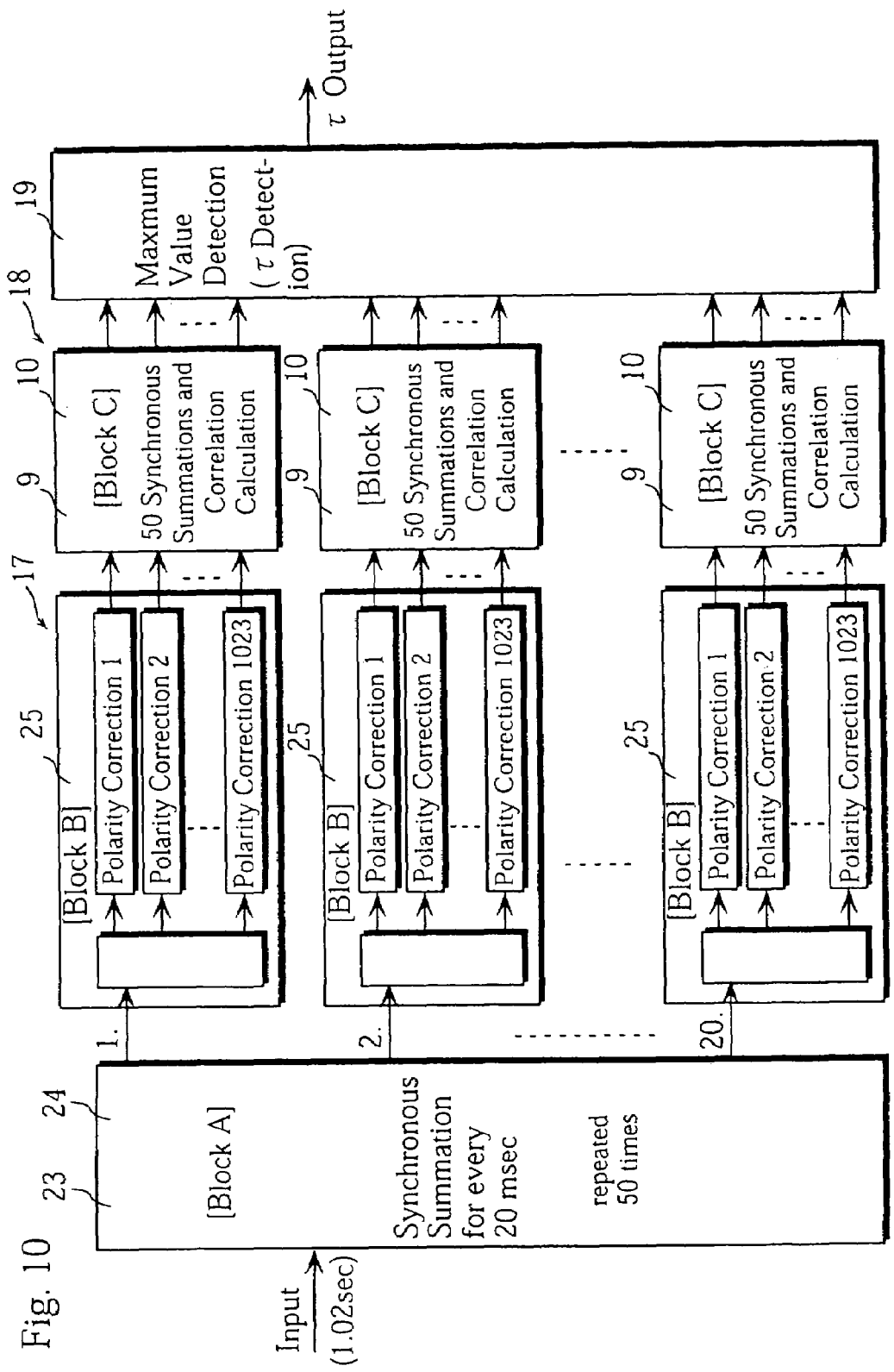
FIG. 10 is an explanatory diagram of the process used to obtain the final correlation function results which are used to determine pseudorange.

The compressed signal frame given by (2) is then processed within Block B of FIG. 10, where it is cross-correlated with a PN code replica and corrected for data bit polarity.

Figure 12:
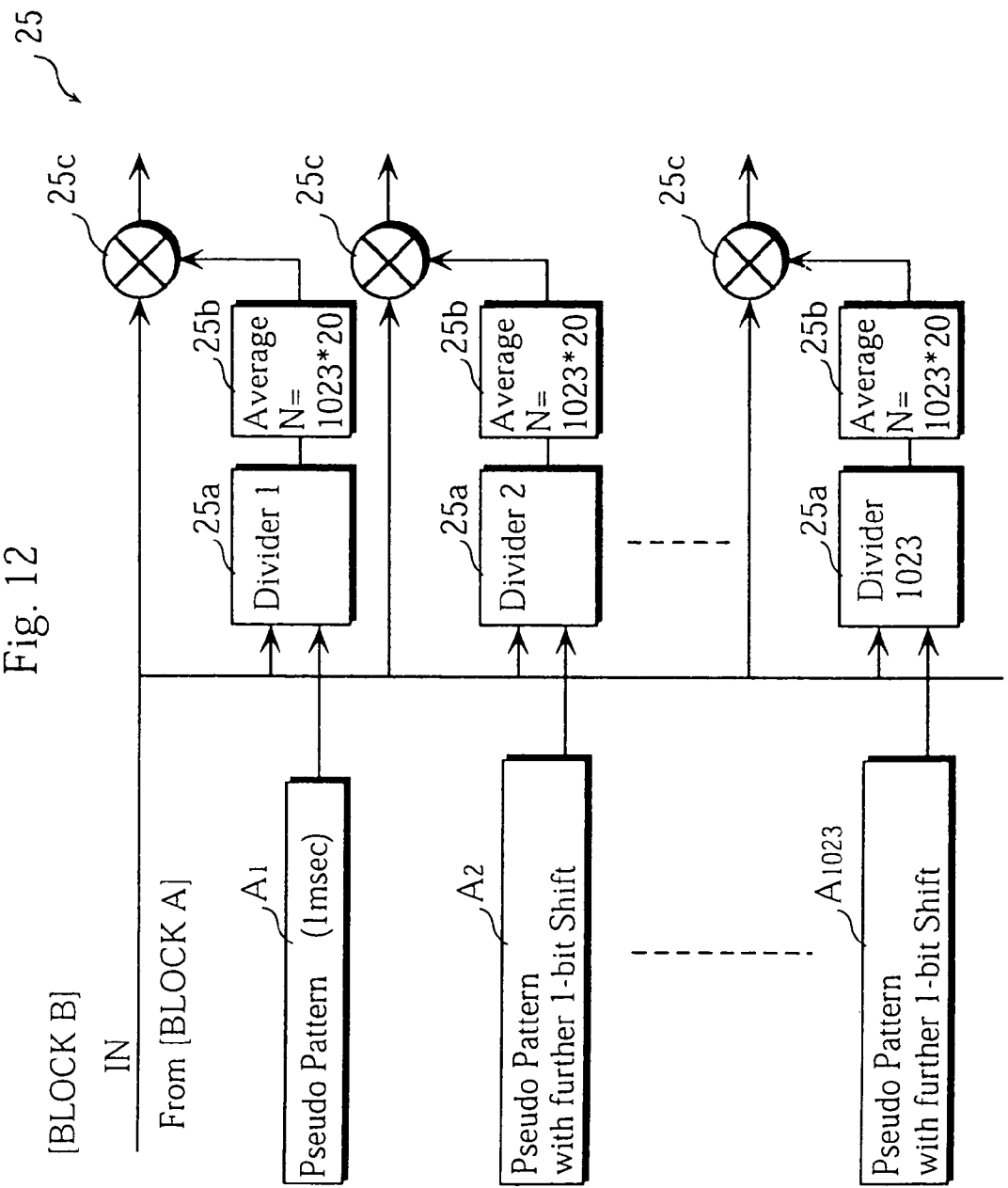
FIG. 12 is an explanatory diagram of a navigation data bit polarity modifying calculation block portion which homogenizes the PN code frames.

The processing within Block B of FIG. 10 is shown in more detail in FIG. 12. First, the compressed PN code frame given by (2) is correlated against a replica (pseudopattern) of the PN code for the satellite whose signal is being processed. This pseudopattern, consisting of 1023 chips with 1 sample per chip, will be called pseudopattern A. Each sample of pseudopattern A has the value +1 or −1. Referring to FIG. 12, the process of correlation consists of delaying pseudopattern A in increments of 1 chip (a total of 1023 shifted positions), and for each shifted position multiplying the samples of the compressed signal frame by the corresponding samples of the shifted pseudopattern A. In FIG. 12 the compressed signal frame labeled "IN From BLOCK A" is given by expression (2) and is multiplied by each of the 1023 shifted versions of pseudopattern A contained in the blocks A1 through A1023. The multiplications take place in the blocks 25*a*. (these blocks are called dividers, which are equivalent to multipliers because the pseudopattern chips have values of +1 or −1. In this case multiplication produces the same result as division).

The 1023 delayed positions of pseudopattern A contained in A1 through A1023 are cyclic, which means that chips "wrap around." For example, if the unshifted pseudopattern is [0100110001110 . . . 101], then the pattern delayed by 1 chip is [10100110001110 . . . 10] and the pattern delayed by 2 chips is [010100110001110 . . . 1] (0 represents the value of −1 for notational simplicity).

The correlation operation can be expressed mathematically in a simple form by writing $$CORR = (1/N)\Sigma(SIG2 \times A) \quad (3)$$
$$= (1/N)\Sigma[(20 \times DATA \times CA + NOISE') \times A]$$
$$= (1/N) \times 20 \times DATA \times \Sigma(CA \times A) +$$
$$(1/N)\Sigma(NOISE' \times A)$$

where CORR represents the correlation value, and the index of summation runs from 1 to 1023. As indicated in FIG. 12, the correlation operation (3) is performed 1023 times on the compressed signal SIG2, each correlation using a different cyclic shift of pseudopattern A. Thus, CORR and A should be indexed by the appropriate shift, however this indexing has been omitted for simplicity. Note that the correlation in (3) is scaled by, the number 1/N. Although N could be any positive integer, the value N=20×1023 is convenient, as will be seen shortly.

The next processing step is to strip the navigation data modulation from the compressed signal (second input signal) given by (2). This process, called data polarity homogenization, is achieved by multiplication of the compressed signal by each of the 1023 correlation values to obtain the homogenized signal SIG3:

$$SIG3 = SIG2 \times CORR \quad (4)$$

The multiplications are performed by the multipliers 25*c* in FIG. 12. To understand how this process removes changes in data bit polarity, assume that pseudopattern A is aligned with the received PN sequence CA. Then the product CA×A=1, since corresponding chips are either both +1 or both −1. Expression (3) can then be simplified:

$$CORR = (1/N) \times 20 \times DATA \times \Sigma(CA \times A) + \quad (5)$$
$$(1/N)\Sigma(NOISE' \times A)$$
$$= (1/N) \times 20 \times DATA \times 1023 + (1/N)\Sigma(NOISE' \times A)$$
$$= (1/N) \times 20 \times DATA \times 1023 + NOISE''$$

Since pseudopattern A has values +1 and −1, the sequence NOISE'×A in expression (5) has the same statistics as NOISE' and therefore consists of 1023 independent zero-mean samples, each with variance $20\sigma^2$. Thus, NOISE" is a random variable with variance $(1023 \times 20\sigma^2)/N^2$. Substituting the value N=20×1023 into this expression and also into expression (4) gives $$CORR = DATA + NOISE'' \quad (6)$$

Where DATA is a single number with value +1 or −1 and NOISE" is a zero-mean random variable with variance $\sigma^2/(20*1023)$.

Substitution of expression (6) into expression (4) makes it evident how the navigation data bits are stripped from the signal (or homogenized):

$$SIG3 = SIG3 \times CORR \quad (7)$$
$$= (20 \times DATA \times CA + NOISE') \times (DATA + NOISE'')$$
$$= 20 \times DATA \times CA \times DATA + 20 \times DATA \times CA \times$$
$$NOISE'' + NOISE' \times (DATA + NOISE'')$$
$$= 20 \times CA + NOISE'''$$

where we have made use of the fact that DATA×DATA=1. From (7) it is seen that the polarity of the navigation data is now always 1. The SIG3 signals, one corresponding to each of the 1023 values of the correlation CORR, emerge from the 1023 corresponding multipliers 25c in FIG. 12. The output of each multiplier consists of 50 compressed signals, each the result of synchronously adding 20 1-msec frames of data, and each having been stripped of navigation data polarity changes (homogenized).

Figure 13:
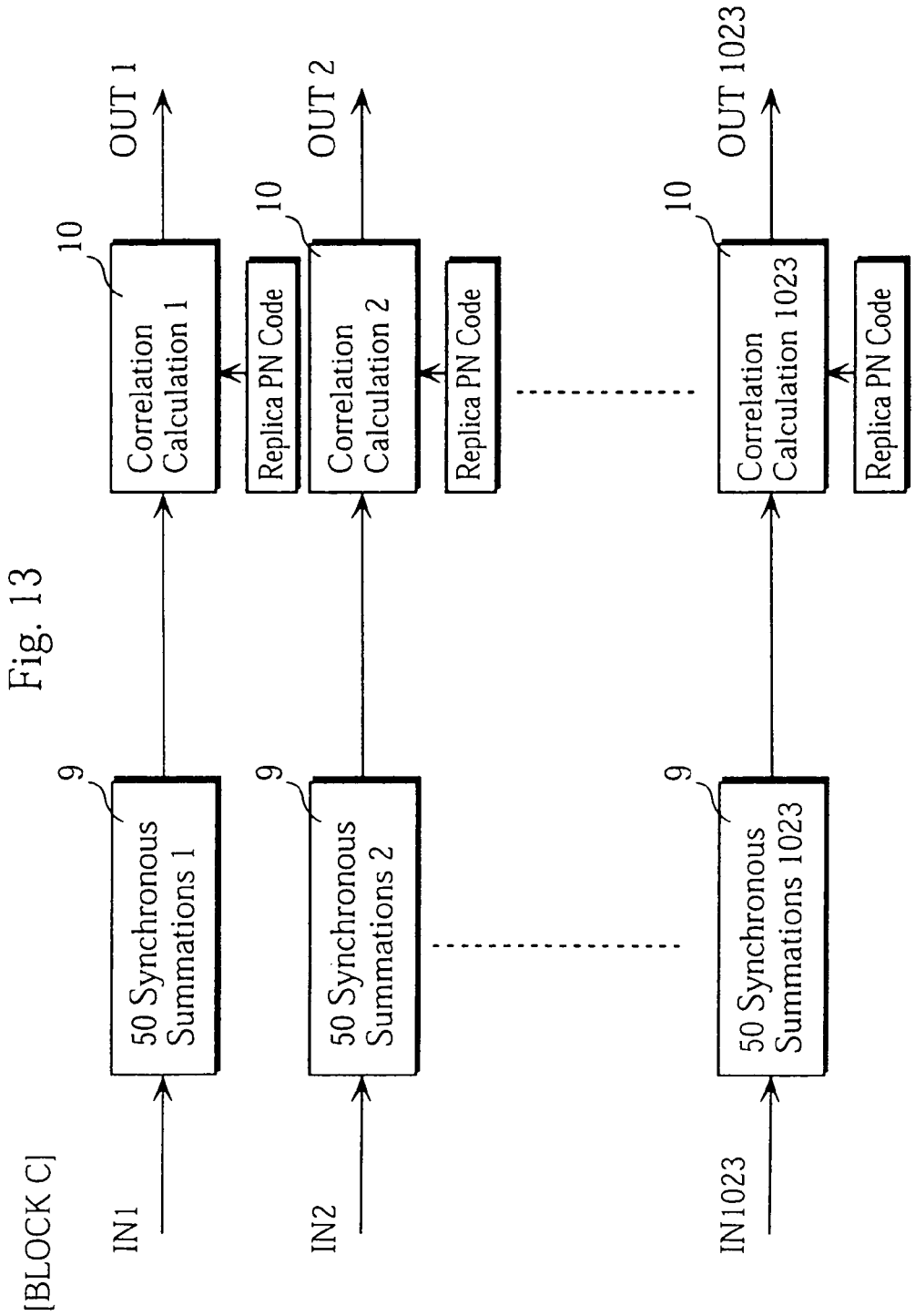
FIG. 13 is an explanatory diagram showing a synchronous summation block portion and a correlation calculation block portion for obtaining the final correlation function results.
Figure 14:
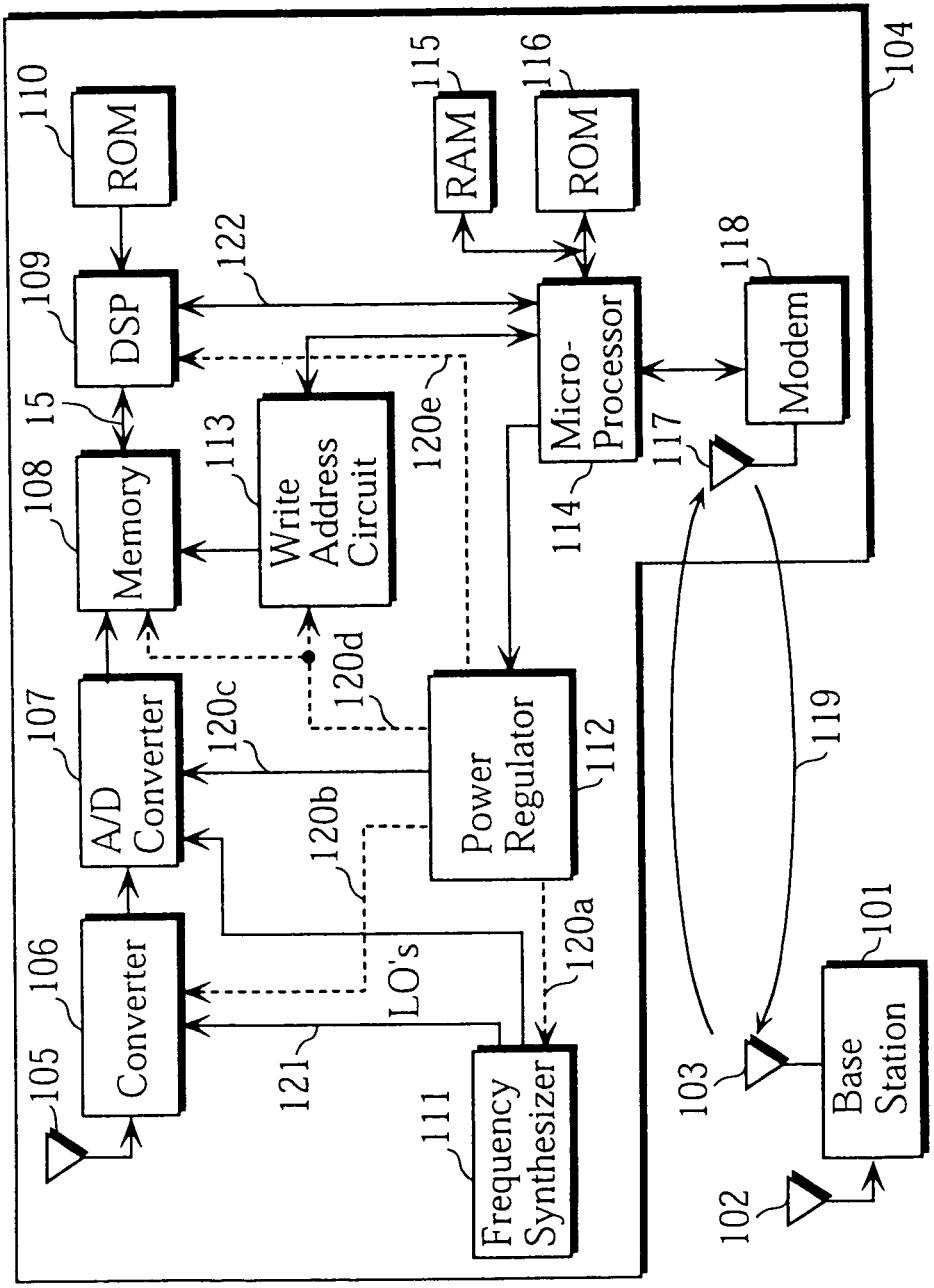
FIG. 14 is a block diagram showing a conventional aided GPS position measuring system.
Figure 15A:
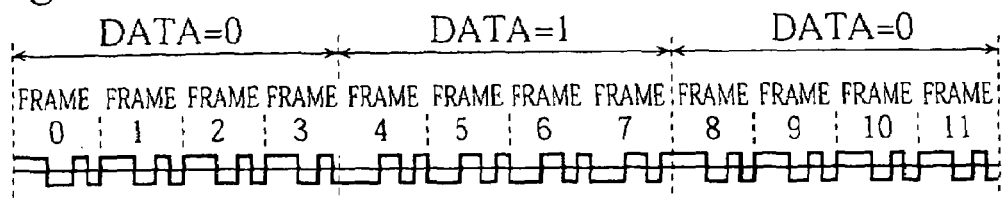
FIGS. 15A through 15E are explanatory diagrams of the conventional aided GPS position measuring system.
Figure 15B:
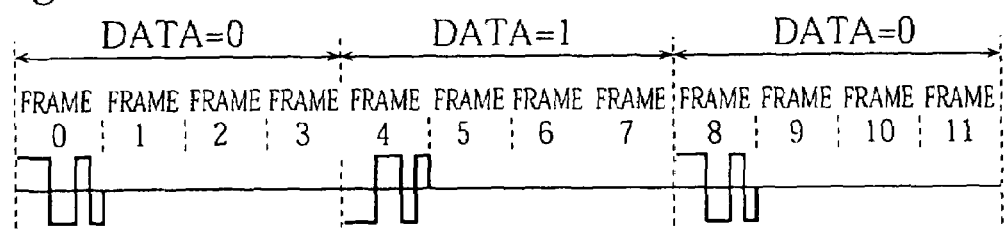
Figure 15C:
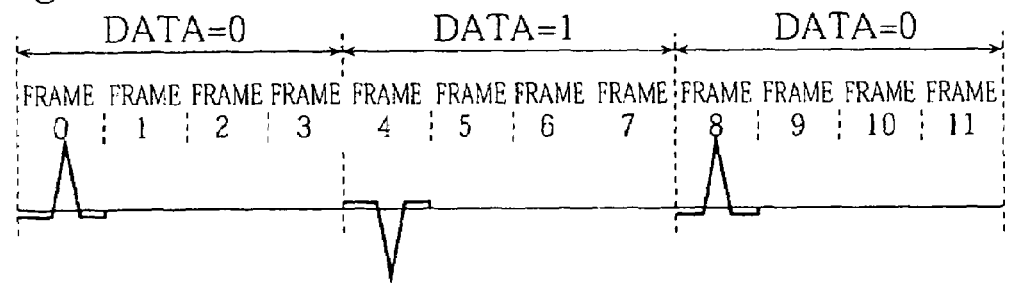
Figure 15D:
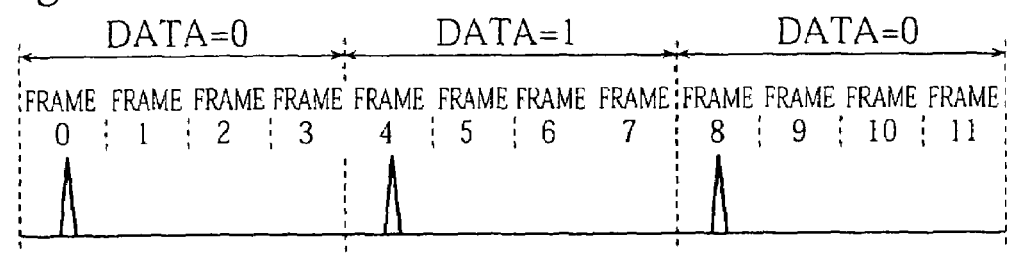
Figure 15E:
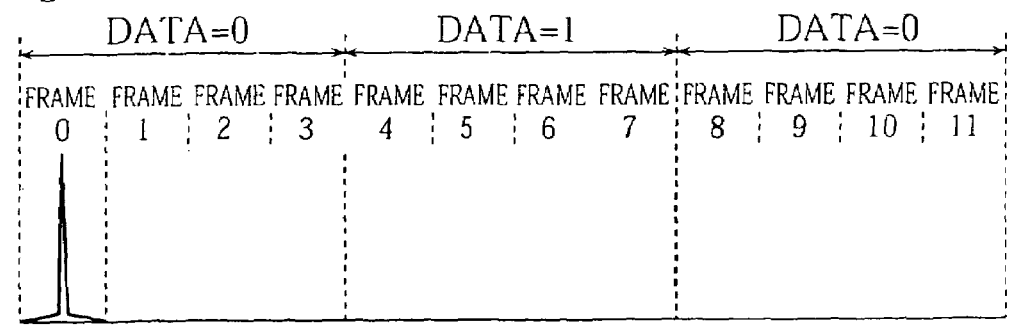

The next stage of processing takes place in Block C, as shown in FIG. 13. The 50 compressed homogenized signals just described are now synchronously summed in a synchronous addition block 9 to produce a further compressed single 1-msec frame of signal (there are 1023 such blocks, each synchronously summing the output of a corresponding multiplier output from Block B of FIG. 12). The results of the synchronous summations are stored in memory portions 53 and 63 of FIG. 4 (Process $F_6$ in FIG. 7).

Figure 11:
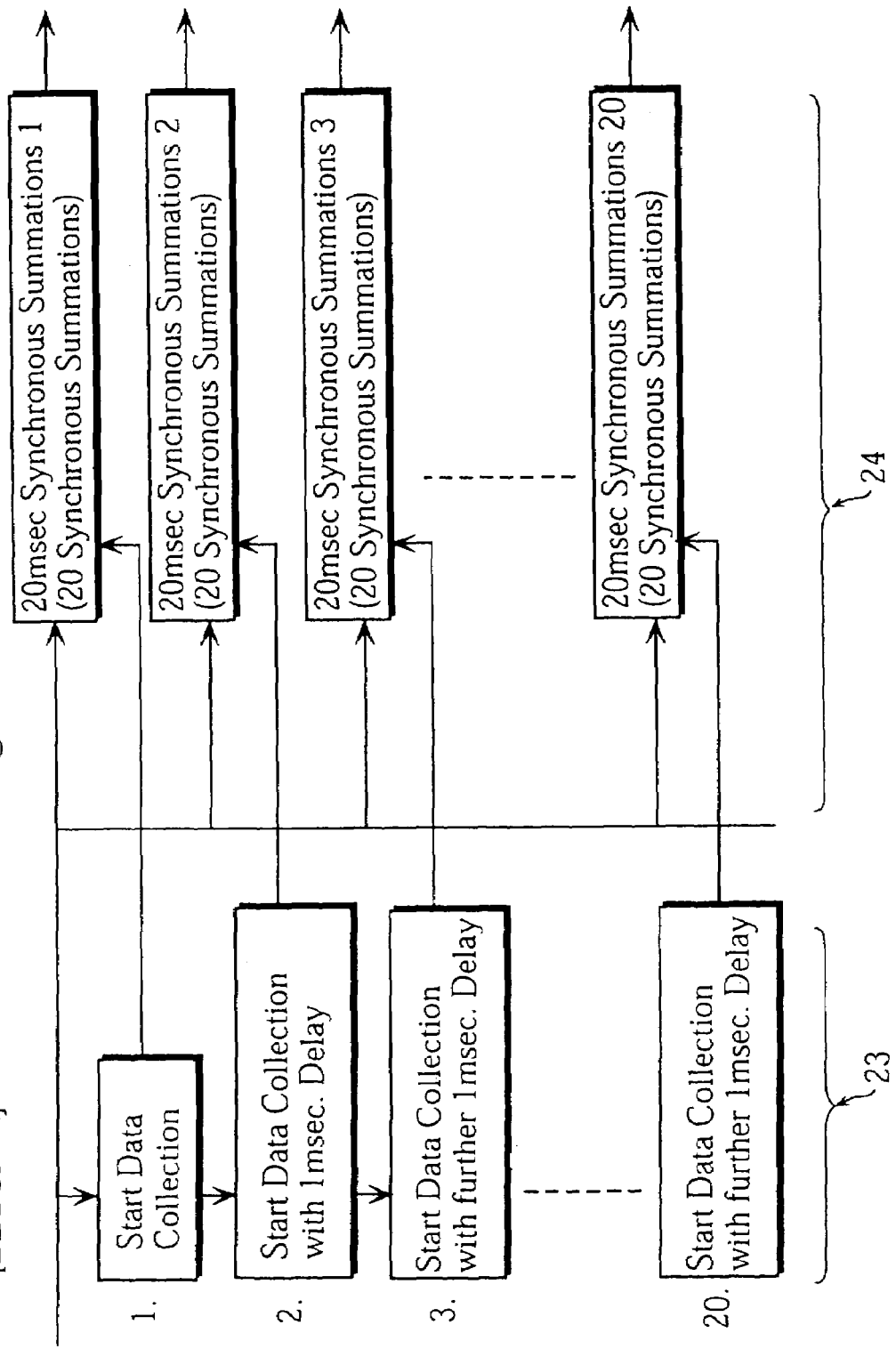
FIG. 11 is an explanatory diagram showing a first calculation block portion and a second calculation block portion in processing the captured GPS signal.

This synchronous summation process is the same type of summation previously performed in Block A of FIG. 11, except that 50 frames are summed instead of 20. These 50 frames stored as rows of 1023 samples each in memory can be denoted by D(1:m, 1:s), where m=50 and s=1023. The result of the synchronous summation is a single frame, denoted by SUM, consisting of 1023 samples. Expressed mathematically, the $k^{th}$ sample of SUM is $$SUM(k) = \sum_{j=1}^{50} D(j, k) \quad k = 1, 2, \ldots, 1023 \quad (8)$$

It is known that synchronous summation multiplies the ratio of signal amplitude to noise standard deviation (i.e., SNR) by the factor $\sqrt{m}$, which in this case is $\sqrt{50}$, representing about 17 dB of processing gain. In the previously performed Block A synchronous summations, the value of m was 20, so there the SNR was improved by the factor $\sqrt{20}$, or about 13 dB of processing gain. Assuming that the data bit polarities were correctly homogenized in the Block B processing (FIG. 10), the total increase in SNR from both stages of synchronous summation would be by a factor of $\sqrt{20} \times \sqrt{50} = \sqrt{1000}$, representing 17 dB+13 dB=30 dB of processing gain. However, this amount of gain is generally not fully realized with signals that are too weak to correctly detect the polarity of the navigation data bits in the Block B processing.

The next stage of processing is conducted by the correlation calculation blocks 10 in FIG. 13. Here the results of synchronous summation in blocks 9, having been stored in memory portions 53 and 63 of FIG. 4, are cross-correlated with a replica PN sequence (the same sequence as pseudopattern A) prepared by the receiver terminal 11. The results of cross-correlation of the I signals are stored in the memory portion 54 of FIG. 4, and the results of cross-correlation of the Q signals are stored in the memory portion 64.

The I and Q correlation functions are respectively the real and imaginary parts of a complex-valued correlation function, which are combined to form the magnitude of the correlation function, and the magnitude is stored in the memory portion 70 of FIG. 4. To form the magnitude, corresponding samples of the I and Q correlation functions are squared and added together, and the square root of the sum is calculated. There are a total of 1023 such magnitude functions, corresponding to the 1023 I (and Q) correlations shown in FIG. 13.

Although the correlation calculations are well-known, these are described briefly here. The outputs of the synchronous summations in blocks 9 contain one period of the C/A PN codes transmitted by the plurality of GPS satellites orbiting the Earth. Each satellite transmits a different code, but all codes have the same period (1 msec). At the satellite, the codes biphase modulate a carrier at the $L_1$ frequency of 1575.42 MHz, which is the same for all satellites. Modulation of the carrier by the code produces a signal spectrum much wider than that needed to convey the navigation data modulation. For this reason, the signals are called spread spectrum signals. At the receiver terminal 11 (and also at the base station reference GPS receiver) the signals from all satellites are superimposed. Although these signals appear additively combined at the receiver, they can by separated by a process called despreading. For purposes of explanation, suppose that signals are being received at receiver terminal 11 from two satellites $S_1$ and $S_2$. The C/A code for each of the satellites is known, and a replica of each code is stored at the receiver terminal. In the present invention, the replica codes are stored in the ROM 46 of the signal processing portion 21 of FIG. 3. The receiver shifts the received signals to baseband (i.e., zero frequency), which removes the carrier and leaves only the C/A codes (plus navigation data modulation) received from the satellites. To recover the signal from satellite $S_1$, the baseband signal is cross-correlated with the stored replica code for that satellite. If x(n) represents samples of the received baseband data (either I or Q), and h(n) represents samples of the stored C/A code, then the correlation process produces a sequence y(k) of output samples according to the formula $$y(k) = \sum_{n=1}^{N} x(n)h(n+k) \quad k = 1, 2, \ldots, N \qquad (9)$$

The output sequence y(k) is called the cross-correlation function of the received signal with the replica code. The integer k represents a cyclic time shift of the replica code. For some value of shift k, the shifted replica code h(n+k) will line up with the same code sequence contained in the received signal x(n). When this happens, each chip in the received code will have the same polarity as that of the shifted replica code, and the summation in (9) will build up to a relatively large value as compared to the value obtained with other shifts. For this particular value of k, it is well known that the signal to noise ratio (SNR) of the output sample y(k) will be improved by the factor $\sqrt{N}$ as compared to any single sample x(n) of the received signal, assuming that the noise samples are uncorrelated identically distributed random variables. In our explanations of the present invention, N=1023, so the SNR increases by the factor $\sqrt{1023}$, a processing gain of about 30 dB. The correlation calculation in (9) can also be accomplished by Fast Fourier Transform methods, but the conventional calculation is shown here to explain the principle.

The total processing gain for the present invention, assuming that the polarity of the data bits can be reliably homogenized, is the gain from both synchronous summation processes (13+17=30 dB as previously calculated) plus the final correlation (30 dB), which equals 60 dB. The SNR voltage gain is $\sqrt{20} \times \sqrt{50} \times \sqrt{1023} = \sqrt{1,023,000} \cong 1,012$. These calculations assume that T=1 sec of signal data is captured. This amount of processing gain assures that the delay of very weak GPS signals embedded in the noise can be measured to provide a position.

Returning now to our description of the signal processing, once the magnitudes of the correlation functions have been calculated and stored in memory portion 70 of FIG. 4, the next step is to calculate the pseudorange to the satellite. This operation is performed by the pseudorange detecting block 19 in FIG. 10 (this block is also shown inside the signal processing block 21 within the receiver terminal 11 of FIG. 2). The pseudorange is the distance between the satellite and the GPS receiver terminal 11, including the error due to receiver clock bias. The pseudorange is determined by locating the largest peak value among of all of the 1023 correlation magnitude functions, as well as the delay τ where this peak value occurs (each of the 1023 samples of a correlation function magnitude corresponds to a delay value). Once the delay τ of the largest peak is obtained, the pseudorange can be obtained.

It should be remembered that all processing that has been described must be replicated 20 times, corresponding to the 20 time shifts in the starting time of the processing. As previously mentioned, this is necessary in order to assure that in one of the 20 cases, data bit polarities will not change during synchronous summation to form the second signals. Thus, the a search for the peak value of the correlation magnitude functions which has just been described must involve a search over all 20 cases.

The final step in processing is to calculate the position of the receiver terminal, which is performed by the position calculation device 20 of FIG. 2. This device uses the pseudoranges to the satellites as described above, as well as additional information from the base station 1 to obtain a position. This additional information includes the positions of the base station and of the satellites, and pseudoranges from the base station to the satellites. Methods of calculating position are well-known and easily realized.

At this point we summarize the previous description of the present invention. Although it is virtually impossible to determine position inside many buildings using a conventional GPS receiver, the present invention can remarkably enhance the sensitivity of the GPS receiver terminal 11 to the point where even the very weak signals inside buildings can be used for positioning. Furthermore, this high sensitivity can be achieved using only 1 sec of captured GPS signal.

The present invention operates by storing 0.5 to 1 second or more of Doppler-compensated GPS received signal data. The data is then synchronously summed in 50 20-msec blocks, to provide 50 1-msec compressed signal with coherent processing gain. The synchronous summation is performed for 20 starting delays in increments of 1 msec to assure that one of the starting delays will be near a navigation data bit boundary, thus assuring that all of the 20 msec blocks of data lie within data bits.

Then, the compressed signals (second signals comprised of synchrously summed data) are correlated against 1023 shifted positions of a replica PN code (pseudopattern A) stored in the receiver terminal 11. The compressed signals are then multiplied by the correlation values for each shift. This process modifies (homogenizes) the polarity of the navigation data bits, resulting in compressed signals with no navigation bit polarity changes (homogenized signals).

The homogenized signals are then synchronously summed for further processing gain, to obtain a highly enhanced 1-msec signal derived from the full signal capture interval (T=1 sec). This signal has a greatly improved SNR due to the synchronous summing processes. The signal is correlated with the replica PN code stored in the receiver terminal 11, and the pseudorange is is obtained from the delay of the peak correlation value.

Although the signal capture interval T used in the explanation of the present invention is 1 sec, it could have other values, perhaps from 0.5 sec to more than 1 sec. Shorter times improve the processing speed, but at the cost of lower sensitivity. Longer times are preferred, because the processing gain is greater and the sensitivity is enhanced. However, more memory and a longer processing time are required.

A major advantage of the present invention is that transmission of the navigation data bit sequence from an outside source (for example, the base station) is not required in order to remove polarity reversals from the signal at the receiver terminal. Instead, the receiver terminal itself detects the polarity of each data bit and uses the detected polarities to homogenize the signal. This permits synchronous summing over the full signal capture interval, followed by correlation, to obtain the high sensitivity needed to obtain reliable positioning inside buildings or in any area where the signals are very weak.

While preferred embodiments of the present invention have been described in this specification, it is to be understood that the invention is illustrative and not restrictive, because various changes are possible within the spirit and scope of the invention. Embodiments other than the one described might be preferred, depending on the hardware and software technology available. For example, although the Doppler correcting portion 16, the polarity modifying device 17, the synchronous summation-correlation calculation device 18, and the pseudorange detecting device 19 in FIG. 2 have been described in terms of software implementation, these functions may be composed of hardware or a combination of hardware and software.

Also, the present invention is not restricted to use with GPS signals, and can be used in any positioning system which uses periodic PN signals, for example, in the Galileo satellite navigation system.

What is claimed is:

1. A GPS position measuring method in which a receiver terminal receives a signal from a satellite and calculates pseudorange between the satellite and the receiver terminal by capturing a portion of the received satellite signal having predetermined time duration, comprising the steps of:
   obtaining a predetermined number of first input signals, each having a length equivalent to one bit of navigation data, from the received satellite signal of predetermined time duration directly sent from the satellite and directly received by the receiver terminal, and using a plurality of delays of the beginning of data processing with spacing of the delays being small relative to the duration of a navigation data bit;
   synchronous summation of the first input signals to make second input signals;
   a polarity modifying calculation process in which a pseudopattern prepared by the receiver terminal is applied to the second input signals to homogenize the polarity of the navigation data bits;
   synchronous summation of the signals obtained by the polarity modifying calculation process from the received satellite signals having predetermined time duration;
   correlation calculation of the obtained synchronous summation signals and a replica PN code prepared by the receiver terminal;
   detecting the signal delay value by using the results of the correlation calculation; and
   calculating the pseudorange by using the delay value.

2. A GPS position measuring method in which a receiver terminal receives a signal from a satellite and calculates pseudorange between the satellite and the receiver terminal by capturing a portion of the received satellite signal having predetermined time duration, comprising the steps of:
   an early signal process, in which a predetermined number of first input signals, each having a length of 20 msec, are obtained from the received satellite signal of predetermined time duration, and using a plurality of delays of the beginning of data processing with spacing of delays being small compared to the length of a navigation data bit, conducted on the received satellite signal of predetermined time duration;
   synchronous summation of the first input signals to make second input signals;
   a polarity modifying calculation process in which result of multiplication or division and average calculation of the second input signals by a pseudopattern prepared by the receiver terminal multiplies the second input signals further;
   synchronous summation of the signals obtained by the polarity modifying calculation process;
   correlation calculation of said synchronously summed signals and a replica PN code prepared by the receiver terminal;
   detecting the delay value using the results of the correlation calculation; and
   calculating the pseudo range using the delay value.

3. The GPS position measuring method as set forth in claim 1, wherein the pseudopattern in the polarity modifying calculation process is a data column of a predetermined bit number equivalent to a unit frame of the signal from the satellite, and composed of groups of the data columns of the same number as the predetermined bit number serially changed for one bit respectively.

4. A GPS position measuring system in which a receiver terminal receives a signal from a satellite and calculates pseudorange between the satellite and the receiver terminal using the received satellite signal of predetermined time duration, comprising a receiver terminal provided with;
   a first calculation block portion to obtain a predetermined number of first input signals, each having a length equivalent to one bit of navigation data, from the received satellite signal of predetermined time duration, and using a plurality of delays of the beginning of data processing with the spacing of delays being small compared to the length of a navigation data bit;
   a second calculation block portion to synchronously sum up the first input signals to make a second input signal;
   a polarity modifying calculation block portion in which the result of multiplication or division and average calculation of the second input signals by a pseudopattern prepared by the receiver terminal multiplies the second input signals further;
   a synchronous summation block portion to conduct synchronous summation of the signals obtained by the polarity modifying calculation block portion from the received satellite signal having predetermined time duration;
   a correlation calculation block portion to conduct correlation calculation of the obtained synchronous summation signals and a replica PN code prepared by the receiver terminal; and
   a pseudo range detecting block portion to detect delay value using the results of the correlation calculation and calculate the pseudorange using the delay value.

5. The GPS position measuring system as set forth in claim 4, wherein the polarity modifying calculation block portion has a multiplying-dividing portion to multiply or divide the second input signal with the pseudo pattern prepared by the receiver terminal, an average calculation portion to average the result by the multiplying-dividing portion, and a polarity modifying calculation portion to multiply the second input signal by the result of the average calculation portion.

6. The GPS position measuring method as set forth in claim 2, wherein the pseudopattern in the polarity modifying calculation process is a data column of a predetermined bit number equivalent to a unit frame of the signal from the satellite, and composed of groups of the data columns of the same number as the predetermined bit number serially changed for one bit respectively.

* * * * *